US007972660B2

(12) United States Patent
Ring et al.

(10) Patent No.: US 7,972,660 B2
(45) Date of Patent: Jul. 5, 2011

(54) ELECTROSTATIC FLUIDISED POWDER BED COATING PROCESS

(75) Inventors: John Ring, Ponteland (GB); Michele Falcone, Como (IT); Robert Edward Barker, Hebburn (GB); Andrew George Cordiner, Gateshead (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 267 days.

(21) Appl. No.: 11/995,510

(22) PCT Filed: Jul. 11, 2006

(86) PCT No.: PCT/EP2006/064087
§ 371 (c)(1),
(2), (4) Date: Aug. 26, 2008

(87) PCT Pub. No.: WO2007/006778
PCT Pub. Date: Jan. 18, 2007

(65) Prior Publication Data
US 2008/0305271 A1 Dec. 11, 2008

(30) Foreign Application Priority Data
Jul. 11, 2005 (EP) .................................. 05106313

(51) Int. Cl.
B05D 1/06 (2006.01)
B05D 1/22 (2006.01)
(52) U.S. Cl. .......................... 427/459; 427/460; 427/461
(58) Field of Classification Search ........... 427/459–461
See application file for complete search history.

(56) References Cited

U.S. PATENT DOCUMENTS

| 3,969,547 | A | 7/1976 | Isawa et al. | |
|---|---|---|---|---|
| 4,435,466 | A | 3/1984 | Kuhnel et al. | |
| 4,689,241 | A | 8/1987 | Richart et al. | |
| 5,461,089 | A | 10/1995 | Handyside et al. | |
| 5,547,796 | A | 8/1996 | Kohtaki et al. | |
| 5,610,269 | A | 3/1997 | Sato et al. | |
| 5,856,377 | A | 1/1999 | Sato et al. | |
| 5,885,743 | A | 3/1999 | Takayanagi et al. | |
| 5,955,530 | A | 9/1999 | Inoue et al. | |
| 5,981,653 | A | 11/1999 | Wilmes et al. | |
| 5,998,507 | A | 12/1999 | Adachi et al. | |
| 6,159,556 | A | 12/2000 | Moller et al. | |
| 6,280,798 | B1 * | 8/2001 | Ring et al. | 427/459 |
| 6,284,311 | B1 | 9/2001 | Gregorovich et al. | |
| 6,331,581 | B1 | 12/2001 | Ohnishi et al. | |
| 6,624,238 | B1 | 9/2003 | Ott et al. | |
| 2001/0005735 | A1 * | 6/2001 | Ring et al. | 524/599 |
| 2003/0092799 | A1 | 5/2003 | Koenraadt et al. | |
| 2003/0100667 | A1 | 5/2003 | Bendix et al. | |
| 2004/0009340 | A1 | 1/2004 | Zhu et al. | |
| 2008/0261142 | A1 | 10/2008 | Kittle et al. | |
| 2009/0017209 | A1 | 1/2009 | Morgan et al. | |

FOREIGN PATENT DOCUMENTS

| DE | 287 392 | 2/1991 |
|---|---|---|
| EP | 0 082 490 | 6/1983 |
| EP | 0 372 860 | 6/1990 |
| EP | 0 539 385 | 5/1993 |
| EP | 0 601 235 | 6/1994 |
| EP | 0 687 714 | 12/1995 |
| EP | 0 797 122 | 9/1997 |
| EP | 0 801 333 | 10/1997 |
| EP | 0 805 171 | 11/1997 |
| EP | 0 820 490 | 1/1998 |
| EP | 0 962 502 | 12/1999 |
| EP | 1 211 296 | 6/2002 |
| EP | 1 559 751 | 8/2005 |
| GB | 1373220 | 11/1974 |
| GB | 1 528 110 | 10/1978 |
| GB | 2 074 745 | 11/1981 |
| JP | 58-091463 | 5/1983 |
| JP | 2-046469 | 2/1990 |
| JP | 4-051249 | 2/1992 |
| JP | 7-53728 | 2/1995 |
| JP | 11-133659 | 5/1999 |
| WO | WO 91/18951 | 12/1991 |
| WO | WO 94/11446 | 5/1994 |
| WO | WO 95/28435 | 10/1995 |
| WO | WO 96/32452 | 10/1996 |
| WO | WO 96/37561 | 11/1996 |
| WO | WO 97/08250 | 3/1997 |
| WO | WO 97/45476 | 12/1997 |
| WO | WO 99/30838 | 6/1999 |
| WO | WO 00/01775 | 1/2000 |
| WO | WO 00/15721 | 3/2000 |
| WO | WO 00/53684 | 9/2000 |

(Continued)

OTHER PUBLICATIONS

Svarovsky, "Powder Coating Testing: Methods of Measuring the Physical Properties of Bulk Powders," Oct. 1987, sections 3.2 and 5.2.4.
J.L. Diel, "Wet Color Control—an Efficient Concept for Paint Processing," Process Analyst, Sep. 2004, pp. 74-79.
International Search Report, International PCT Application No. PCT/EP2006/064086, mailed Oct. 16, 2006.
International Search Report, International PCT Application No. PCT/EP2006/064087, mailed Oct. 30, 2006.
International Search Report, International PCT Application No. PCT/EP2006/064088, mailed Aug. 25, 2006.
International Search Report, International PCT Application No. PCT/GB03/03381, mailed Dec. 2, 2003.
Partial European Search Report, European Application No. EP 02 10 6315, dated Aug. 22, 2006.

(Continued)

Primary Examiner — Frederick J Parker
(74) Attorney, Agent, or Firm — Kenyon & Kenyon LLP

(57) ABSTRACT

The present invention pertains to a process for forming a coating on a substrate using a tribo-charging electrostatic fluidized bed process; characterized in that a powder coating is used which has a particle size distribution such that a) $d(v,90) \leq 42.5$ μm, and b) i) the percentage of particles <10 μm in size is $\leq 12\%$ by volume, and/or ii) $[d(s,90) \div d(s,10)]^2 \leq 3.5$, $[d(s,90)-7]d(s,90)$ being greater than 7 μm and $d(s,90)$ and $d(s,10)$ being measured in microns.

16 Claims, 18 Drawing Sheets

FOREIGN PATENT DOCUMENTS

| | | | |
|---|---|---|---|
| WO | WO 00/53685 | | 9/2000 |
| WO | WO 01/28306 | | 4/2001 |
| WO | WO 01/59016 | | 8/2001 |
| WO | WO 01/60506 | | 8/2001 |
| WO | WO 02/098577 | | 12/2002 |
| WO | WO 2004/013703 | | 2/2004 |
| WO | 2004052557 | * | 6/2004 |
| WO | WO 2004/052557 | | 6/2004 |
| WO | WO 2004/052558 | | 6/2004 |
| WO | WO 2007/006777 | | 1/2007 |

OTHER PUBLICATIONS

H. Satoh et al., "Spherical particles for automotive powder coatings," *Progress in Organic Coatings* 34 (1998), p. 193-199.

Group Powder Laboratory Standard Operating Procedure, "The Standard Operating Procedure for the Operation of the Hausner Raito Test Equipment," (1998).

Scott T. Wilson, "Powder 'Fines' Can Be Controlled," *Industrial Finishing*, Nov. 1991.

Donald S. Tyler, "Powder Particle Size Matters," *Products Finishing*, Jan. 1990, p. 66-73.

S.T. Harris, "Future Developments in Powder Coatings," *Thermoset Powder Coatings*, 1988, p. 138-140.

John Cartwright, "Classification of Particle Size of Powder Coatings," *Powder Coatings*, Jun. 1981, p. 12-16.

Geldart et al., "Fluidization of Cohesive Powders," *Powder Technology*, 37, 1984. 25-37.

Geldart et al., "Entrainment of Particles From Fluidized Beds of Fine Powders," *AIChE Symposium Series*, No. 255, vol. 83, 1987.

"A Fully Classified Powder," *Paint and Resin*, Oct. 1989.

Elkotb in Proceeding of ICLASS, 1982, p. 107-115.

B. P. Binks, "Current Opinion in Colloid and Interface Science 7," (2002) p. 21-41.

* cited by examiner

Powder C6 - Deposited PSD

Powder B6.2 : Bulk vs. Deposited Powder (Av. 10 Panels)

Powder B6.2 - Deposited Mass

Powder C20 : Bulk vs. Deposited Powder (Av. 10 Panels)

Powder C20 - Deposited Mass

Powder B20 - Deposited Mass

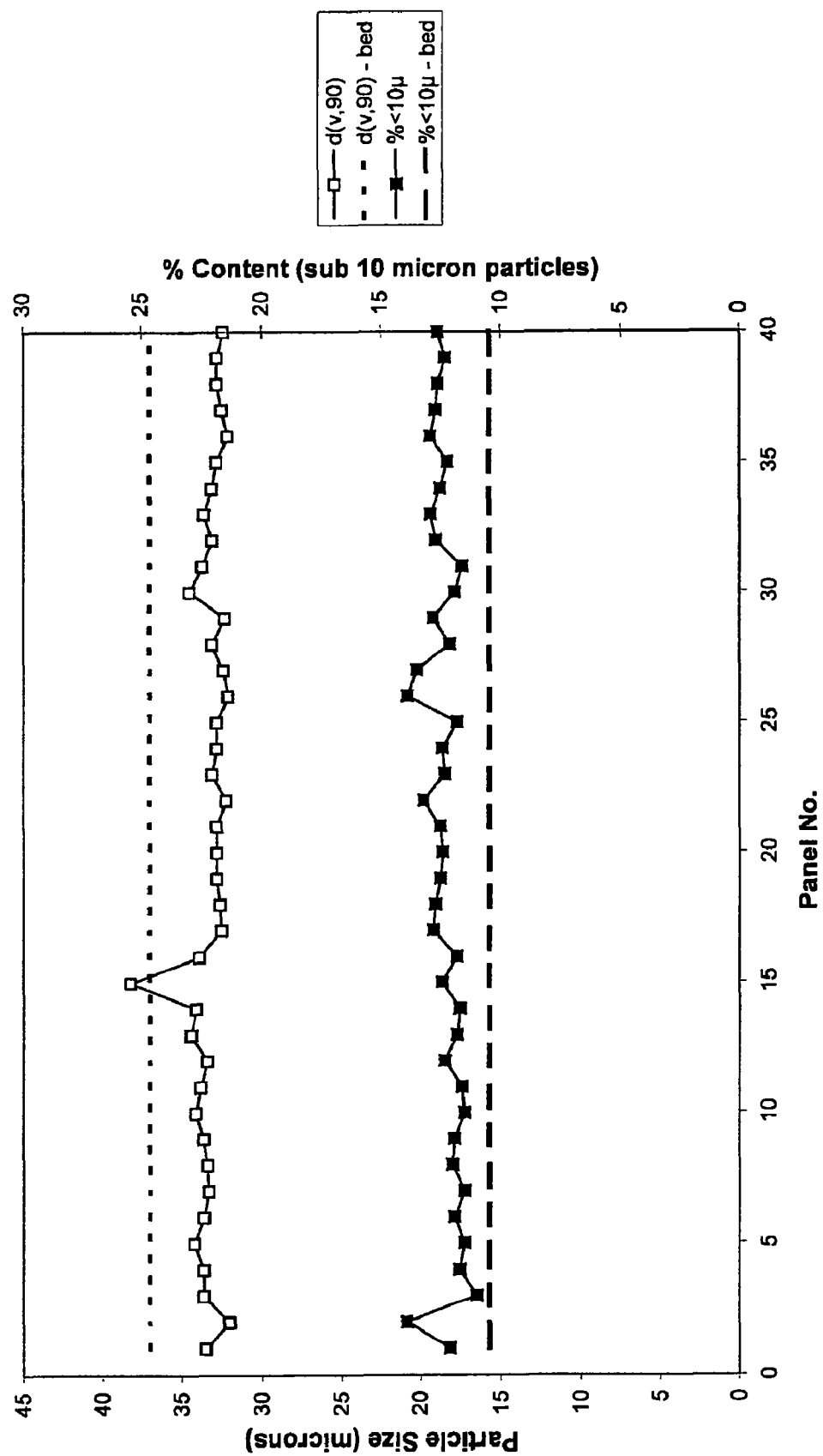

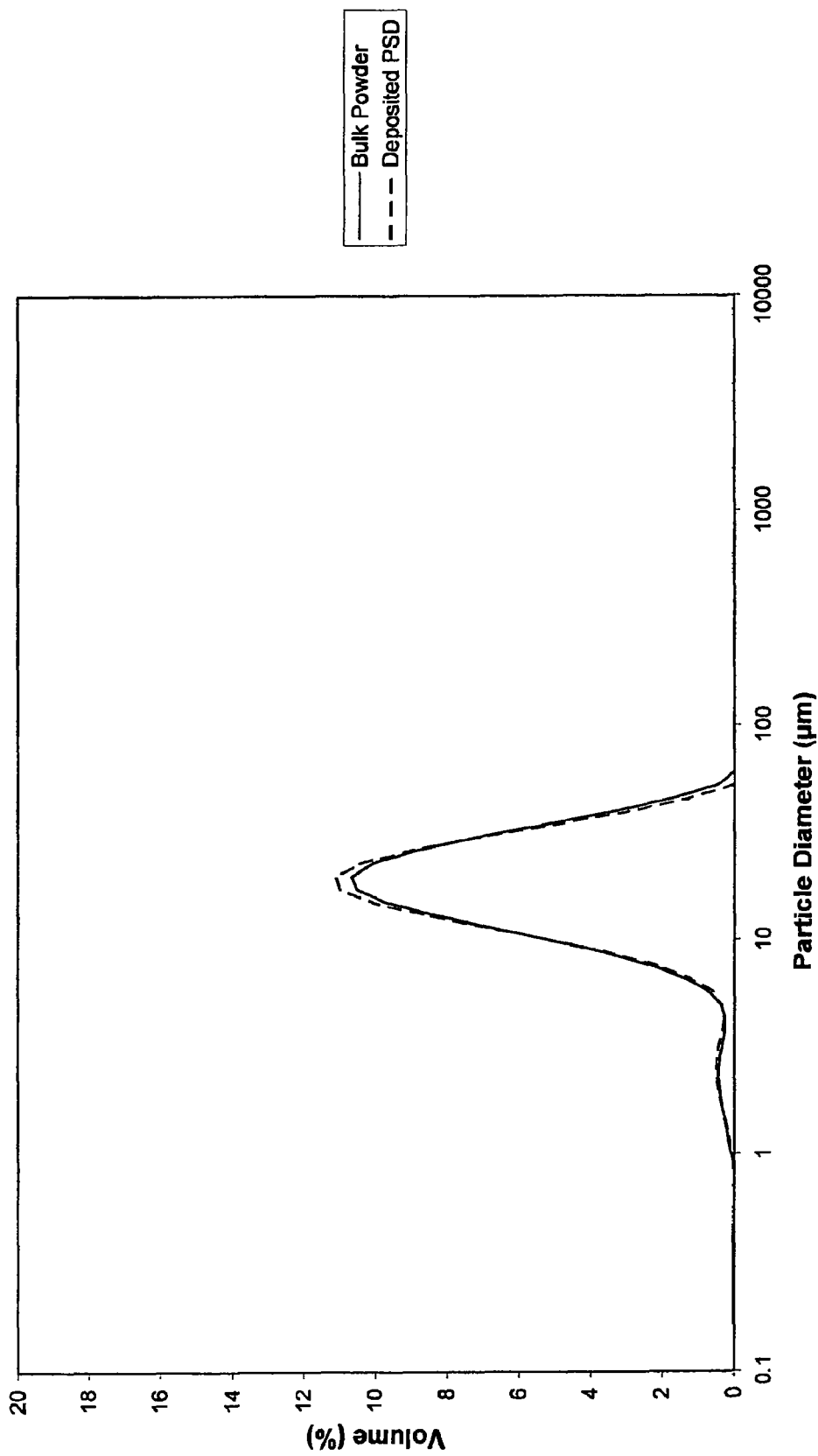

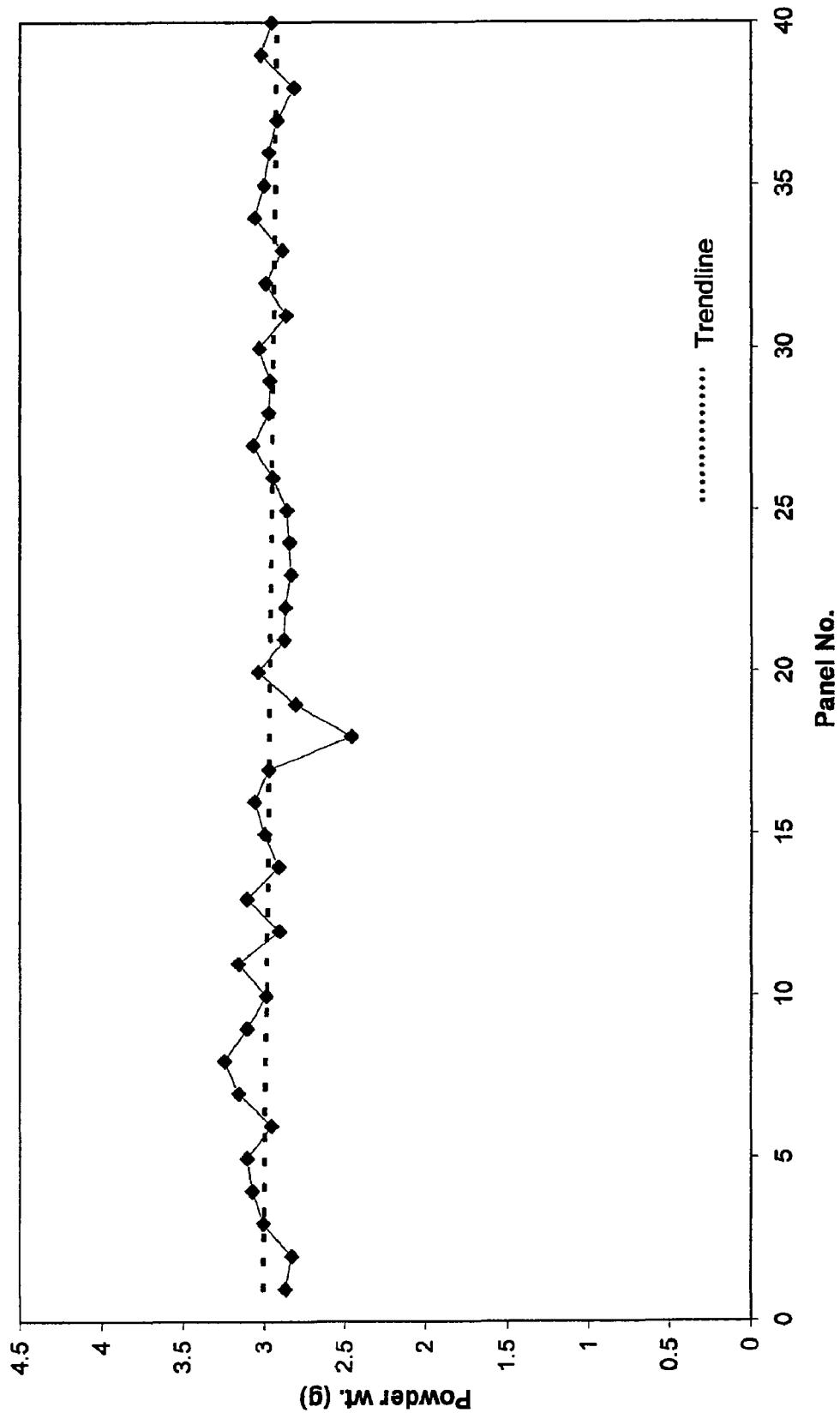

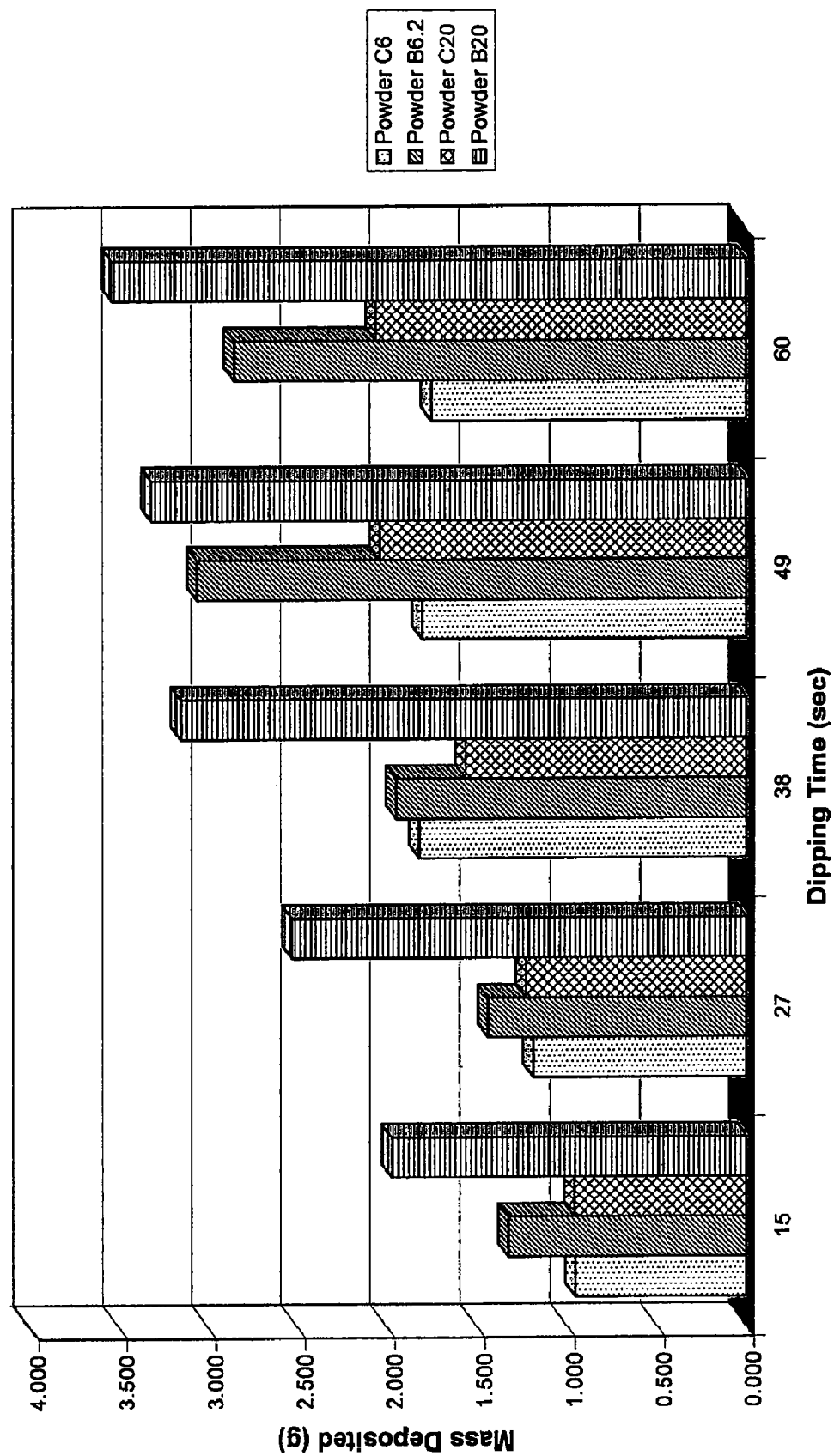

ELECTROSTATIC FLUIDISED POWDER BED COATING PROCESS

FIELD OF INVENTION

This invention relates to a process for the application of powder coating materials to substrates.

BACKGROUND OF THE INVENTION

Powder coating materials generally comprise a solid film-forming resin, usually with one or more colouring agents such as pigments, and optionally they also contain one or more performance additives. They are usually thermosetting, incorporating, for example, a film-forming polymer and a corresponding curing agent (which may itself be another film-forming polymer).

Application methods include electrostatic spray and fluidised-bed processes. After application, the powder is heated to melt and fuse the particles and to cure the coating. The powder coating particles which do not adhere to the substrate can be recovered for re-use so that powder coatings are economical in use of ingredients. Also, powder coating materials are generally free of added solvents and, in particular, do not use organic solvents and are accordingly non-polluting.

Powder coating materials are generally prepared by intimately mixing the ingredients, for example in an extruder, at a temperature above the softening point of the film-forming polymer(s) but below a temperature at which significant pre-reaction would occur. The extrudate is usually rolled into a flat sheet and comminuted, producing a powder with a range of particle sizes. The smaller particles, however, give rise to problems in handling and application, and such problems become more pronounced when the proportion of fine particles is high. Accordingly, manufacturers of powders coatings generally carry out classification process to reduce the "fines" fraction, although the classification processes available (utilising air classifiers) tend to remove also some larger particles, and in practice a compromise has to be reached between reduction of the fines content and avoidance of loss.

Further improvements in handling and application are brought about by addition of one or more fluidity-assisting additives. Examples include alumina or silica. WO 94/11446 describes the use of certain inorganic materials such as the combination of alumina and aluminium hydroxide as fluidity-assisting additives for powder coating materials in which at least 95% by volume of the particles are below 50 μm, and WO 00/01775 describes the use of wax-coated silica for similar and related purposes.

In general, powder coating materials may be applied by electrostatic spray processes or by fluidised-bed processes. An advantage of fluidised bed processes is that they reduce the Faraday cage effect, thereby enabling recessed portions in the substrate workpiece to be coated, and are attractive in other respects, but have the well-known disadvantage that the applied coatings are substantially thicker than those obtainable by electrostatic spray coating processes.

In traditional fluidised bed processes the substrate is preheated (typically to 200° C. to 400° C.) and dipped into a fluidised bed of the powder coating composition. The powder particles that come into contact with the preheated substrate melt and adhere to the surface of the substrate. In such processes the powder coating material acquires a charge solely by friction, i.e. it acquires a tribostatic charge. However, in so-called electrostatic fluidised bed processes, a charge is induced into the system by the direct application of electrical energy. This may be done in a number of ways. In one method, the fluidising air is ionised by means of charging electrodes arranged in the fluidising chamber or, more usually, in the plenum chamber below the porous air-distribution membrane. The ionised air charges the powder particles (corona-charging), which acquire an overall upwards motion as a result of electrostatic repulsion of identically charged particles. The effect is that a cloud of charged powder particles is formed above the surface of the fluidised bed. The substrate workpiece (earthed) is introduced into the cloud and powder particles are deposited on the substrate surface by electrostatic attraction. No preheating of the substrate workpiece is required. Such corona-charging electrostatic fluidised-bed processes are especially suitable for coating small articles, because the rate of deposition of the powder particles becomes less as the article is moved away from the surface of the charged bed. Also, as in the case of the traditional fluidised-bed process, the powder is confined to an enclosure and there is no need to provide equipment for recycling and reblending the overspray that is not deposited on the substrate.

WO 99/30838 describes an alternative (but non-corona-charging) electrostatic fluidised bed process for forming a coating on a conductive substrate, which comprises establishing a fluidised bed of a powder coating composition, immersing the substrate wholly or partly within the said fluidised bed, applying a voltage to the substrate for at least part of the period of immersion, whereby particles of the powder coating composition adhere to the substrate, withdrawing the substrate from the fluidised bed and forming the adherent particles into a continuous coating over at least part of the substrate.

Further (non-corona-charging) electrostatic fluidised bed processes are described in WO 02198577, WO 2004052557 and WO 2004052558. In all of these, the substrate is either electrically isolated or earthed. In WO 02/98577 and WO 2004052557 a voltage is applied to the conductive part of the fluidising chamber, in WO 02/98577 the substrate being conductive and in WO 2004052557 the substrate being either electrically non-conductive or poorly conductive, and in WO 2004052558 an electrically conductive electrode, to which a voltage is applied, is positioned to influence the extent to which charged particles adhere to a region of the substrate.

The processes of WO 99/30838, WO 02/98577, WO 200452557 and WO 2004052558 all rely on tribostatic (friction) charging of the powder material, the charge applied to the substrate or electrodes being used to give particles direction by setting up an electrostatic field. The term tribo-charging electrostatic processes will refer to such (non-corona) processes where a tribostatic charge is developed on the powder and voltage is applied to the system, more especially to the part to be coated or to counter-electrodes.

Corona-charging and tribo-charging electrostatic fluidised bed processes differ from other fluidised bed processes in that an electrical charge is deliberately applied to the system—in the case of corona-charging processes, to the powder, and in the case of the tribo-charging systems mentioned in the patent specifications above, to the substrate or for example to counter-electrodes within the fluidised bed that generate an electric field between the counter-electrode and the earth or oppositely-charged (or differently-charged) workpiece. In other fluidised bed processes, any electrostatic charge which arises in the system is not deliberately applied, but is as a result of friction arising incidentally in the system. This friction arising incidentally in the system however also serves as the source of charge on the powder in tribo-charging electrostatic processes.

SUMMARY OF INVENTION

We have found that powder coating materials of different particle size distributions have different degrees of effectiveness in tribo-charging electrostatic fluidised-bed application processes. We have now found a means by which the particle size distribution of a powder coating material can be tailored to make it especially suitable for use for application in such fluidised bed processes. We have found that the use of a powder coating material having a particular particle size distribution, the definition of which is based upon the surface area of the particles, is particularly effective when used in such processes, and we have also identified an especially suitable particle size distribution in volume terms.

Accordingly, the present invention provides a process for forming a coating on a substrate using a tribo-charging electrostatic fluidised bed process, characterised in that the powder coating material used has a particle size distribution such that
a) $d(v,90) \leqq 42.5$ µm, and
b) i) the percentage of particles <10 µm in size is $\leqq 12\%$ by volume, and/or
   ii)

$$\frac{[d(s, 90) \div d(s, 10)]^2}{[d(s, 90) - 7]} \leq 3.5,$$

$d(s,90)$ being greater than 7 µm, and $d(s,90)$ and $d(s,10)$ being measured in microns, WO 95/28435 describes a method for manufacturing a powder coating composition which can be applied via fluidized bed using a heated substrate, via electrostatic spraying, or via an electrostatic fluidized bed. The use of a tribostatic fluidized bed is not described.

U.S. Pat. No. 6,284,311 describes the application of powder coating via a fluidized bed process using a heated substrate, wherein a coating composition is used with a particle size distribution such that at least 80 wt. % is between 10 and 80 microns. It is most preferred for at least 90 wt. % of the particles to be between 10 and 80 microns. Again, the use of a tribostatic fluidized bed is not described.

U.S. Pat. No. 6,280,798 describes a tribostatic fluidised process. The powder coating composition used therein has a particle size distribution that may be in the range of 1-120 microns, with a mean particle size of 15-75 microns, preferably 25-50 microns, more preferably 20-45 microns. The following requirements are also mentioned as preferred: 95-100 vol. % below 50 microns, 90-100 vol. % below 40 microns; 45-100 vol. % below 20 microns, 5-100 vol. % below 10 micron, preferably 10-70 vol. % below 10 micron, 1-80 vol. % below 5 micron, preferably 3-40 vol. % below 5 micron, d(v) 50 of 1.3-32 micron, preferably 8-24 microns. The specific requirements of the present invention are not disclosed or suggested.

EP 0 687 714 describes a powder coating composition with a volume average particle diameter of 20-50 micron and a standard deviation not greater than 20 micron. The powder coating composition can be applied via electrostatic spray coating, fluidized dipping, or any other application method. The use of a tribostatic fluidised bed is not disclosed.

U.S. Pat. No. 4,689,241 describes an electrostatic fluidized bed powder coating composition which contains no more than 10 wt. % of minus 38 microns particles.

Particle sizes are measurable by laser diffraction techniques, for example by the Malvern Mastersizer X or Malvern Mastersizer 2000. Unless indicated otherwise the particle sizes by surface area are measured herein by the Mastersizer 2000, and particle sizes by volume are measured by the Mastersizer X.

As will be understood in the art, the volume percentiles $d(v,x)$ indicate for a stated particle size (d) the percentage (x) of the total volume of the particles that lies below the stated particle size; the percentage (100-x) of the total volume lies at or above the stated size. Thus, for instance, $d(v,50)$ would be the median particle size of the sample, and on a particle size distribution graph $d(v,90)$ is the point on the curve read along the particle size axis where the area under the curve below this particle size represents 90% by volume of the particles. Thus, $d(v,90)=42.5$ microns indicates that 90% of the particles (by volume) are below 42.5 microns and 10% are above this size.

Similar measurements can be made relating to the percentage of particles related to surface area. Thus, the surface area percentiles $d(s,x)$ indicate for a stated particle size (d) the percentage (x) of the total surface area of the particles that lies below the stated particle size; the percentage (100-x) of the total area lies at or above the stated size. Thus, for instance, $d(s,50)$ would be the median particle size of the sample (based on surface area), and on a particle size distribution graph $d(s,90)$ is the point on the curve read along the particle size axis where the area under the curve below this particle size represents 90% by surface area of the particles. Thus, $d(s,90)=7$ microns indicates that 90% of the particles (the percentage calculated on surface area) are below 7 microns and 10% are above this size.

Powders complying with the requirements specified above show good fluidity and have improved penetration into recessed areas when applied by the tribo-charging electrostatic fluidised bed process above. Moreover, they provide coatings with low variation in film thickness and allow a faster rate of deposition of the coating compared with powders used hitherto.

BRIEF DESCRIPTION OF DRAWINGS

FIG. 15 shows the plot of the d(v,90) and sub-10 μm fraction over time for the deposited powder, and the trendlines for the bulk powder in the fluidised bed are also shown for powder P.

FIG. 16 shows a plot of the particle size distribution for the bulk powder and deposited powder averaged over 10 panels for powder P.

FIG. 17 shows the plot of deposited mass on the panels over time for powder P.

FIG. 18 shows the mass of deposited powder for C6, B6.2, C20, and B20 as a result of coating speed.

DETAILED DESCRIPTION

Figure 1:
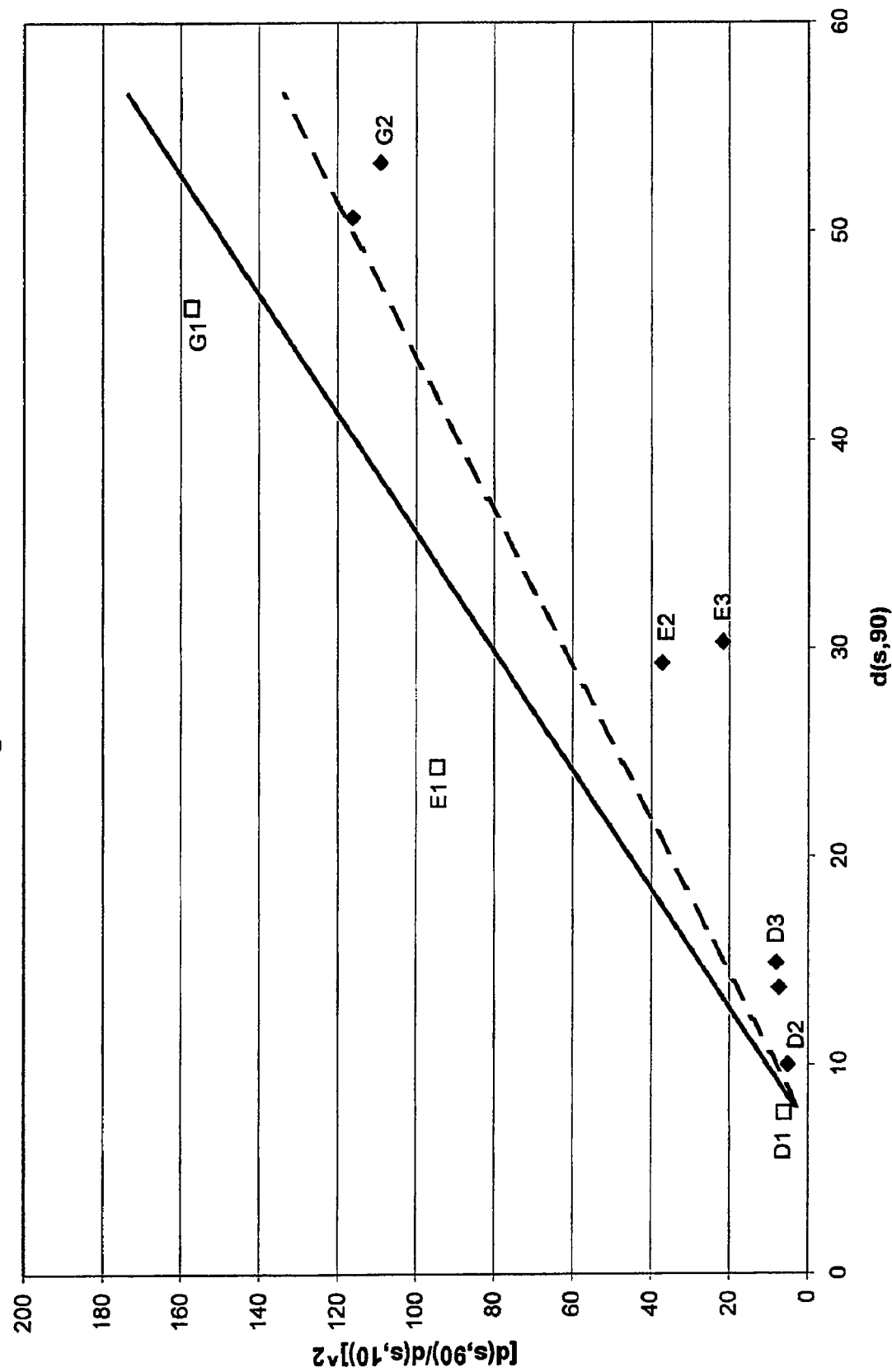
FIG. 1 shows a graph which plots the value of $[d(s,90)/d(s,10)]^2$ against $d(s,90)$ for each powder (D1, E1, G1, D2, D3, E2, E3, and G2).

More especially, the present invention provides a process for forming a coating on a substrate, which comprises establishing a tribo-charging electrostatic fluidised bed of a powder coating material using a fluidising gas; immersing the substrate wholly or partly within the said fluidised bed; applying a voltage for at least part of the period of immersion either to the substrate or to the conductive part of the fluidising chamber or to an electrically conductive electrode positioned to influence the extent to which charged particles adhere to a region of the substrate, whereby particles of the powder coating material adhere to the substrate; withdrawing the substrate from the fluidised bed; and forming the adherent particles into a continuous coating over at least part of the substrate; characterised in that the powder coating material has a particle size distribution such that a) $d(v,90) \leq 42.5$ μm, and
b) i) the percentage of particles <10 μm in size is $\leq 12\%$ by volume, and/or
   ii)

$$\frac{[d(s, 90) \div d(s, 10)]^2}{[d(s, 90) - 7]} \leq 3.5,$$

d(s,90) being >7 μm, and d(s,90) and d(s,10) being measured in microns.

The powder used has $d(v,90) \leq 42.5$ μm, preferably $\leq 42$ μm, more preferably $\leq 41.5$ μm, still more preferably $\leq 41$ μm, even more preferably $\leq 40.5$ μm, in particular $\leq 40$ μm, advantageously $\leq 39$ μm, especially $\leq 38$ μm, more especially $\leq 36$ μm, very especially $\leq 35$ μm. For example the d(v,90) may be substantially 34 μm, and particle sizes less than this should also be mentioned. However, powders having d(v,90) more than this, for example more than 35 μm or more than 36 μm, may also be used. The d(v,90) is generally at least 20 micron, preferably at least 25 micron, more preferably at least 28 μm, more specifically at least 30 μm, still more specifically at least 33 μm.

The percentage of particles $\leq 10$ μm in size is $\leq 12\%$ by volume, preferably $\leq 11\%$ by volume, more preferably $\leq 10\%$, advantageously $\leq 9\%$, especially $\leq 8\%$, in particular $\leq 7.5\%$, more in particular $\leq 7\%$, all by volume. We have found that decrease in the fraction of the sub-10 μm fraction especially below 10% leads to a corresponding increase in coating speed for a given coating thickness and an improvement in evenness of coating. The lower limit for this range obviously is 0.

The particle size distribution of the product used in the process according to the invention generally is such that the percentage of particles of below 20 microns is at least 10% by volume, preferably at least 15% by volume, more preferably at least 20% by volume. If there is less than 10% of particle volume in this range, the particle size distribution will be very steep if the further requirements for the particle size are to be met. The percentage of particles of below 20 microns generally is at most 90% by volume, more in particular at most 80%, still more in particular at most 75%. A powder with a percentage of particles less than 20 μm that is greater than 90% would be very difficult to fluidise. A powder with a percentage of particles less than 20 μm that is less than 10% would have a low yield of manufacture.

In a preferred embodiment of the process according to the invention the powder coating material has d(s,90) greater than 10 μm, more preferably greater than 15 μm. The d(s,90) preferably is $\leq 36$ μm, more preferably $\leq 33$ μm, still more preferably $\leq 32$ μm, even more preferably $\leq 31$ μm, especially $\leq 30$ μm.

In a preferred embodiment the powder coating material has $d(v,90) \leq 36$ μm, preferably $\leq 35$ μm, and the content of sub-10 μm particles is $\leq 10\%$ by volume. More preferably, the powder coating material has d(v,90) of substantially 34 μm and a content of sub-10 um particles $\leq 8\%$ by volume. The preferred ranges specified above also apply here.

It is preferred for the powder coating material to have a content of sub-5 μm particles $\leq 2.5\%$ by volume, a $d(v,50) \leq 25$ μm and a $d(v,99) \leq 50$ μm. In general it is preferred for the powder coating material to have a $d(v,99) \leq 50$ μm. More preferably, the d(v,99) is below 48 μm, still more preferably below 45 μm. The d(v,99) preferably is at least 35 μm, more preferably at least 40 μm.

In general it is preferred for the powder coating material to have a d(v,50) of at most 25 μm, more specifically at most 24 μm, still more specifically at most 23 μm. The d(v,50) is generally preferred to be at least 15 μm, more specifically at least 18 μm.

As already indicated, unless indicated otherwise, the particle size figures by volume referred to herein are measurable on a Mastersizer X instrument, refractive index 1.45, absorption index 0.1.

In another embodiment of the invention, $[d(s,90)/d(s,10)]^2 \div [d(s,90)-7] \leq 3.5$, preferably $\leq 3$, preferably $\leq 2.7$, especially $\leq 2.5$, more especially $\leq 1.9$ advantageously $\leq 1.75$. Generally, this value is above 1. In this embodiment, d(s,90) is greater than 7 μm, preferably greater than 10 μm. As already indicated, the ratio $[d(s,90)/d(s,10)]^2 \div [d(s,90)-7]$ referred to herein is measurable on a Mastersizer 2000 instrument, refractive index 1.45, absorption index 0.01. Especially preferred powders have a d(s,90) of no more than 35 μm, preferably no more than 30 μm, especially no more than 29 μm, for example no more than 27 μm, or no more than 26 μm.

In the powders used in this invention, d(s,10) is preferably greater than 3 μm, more preferably greater than 4 μm. It is preferred for the d(s,10) to be at most 13 μm, more in particular at most 10 μm, more preferably at most 7 μm. Obviously, the values for the d(s,90) and d(s,10) of the powders used need to be matched so as to ensure that the relation between the two parameters fits the formula presented above.

Thus, more especially, the present invention provides a process for forming a coating on a substrate using a tribo-charging electrostatic fluidised bed, characterised in that the powder coating material used has a particle size distribution such that d(v,90) is no more than 42.5 μm, especially ≦42 μm, e.g. ≦41.5 μm or ≦41 μm, advantageously ≦40.5 μm, preferably ≦40 μm, advantageously ≦39 μm, especially ≦38 μm, more especially ≦36 μm, very especially ≦35 μm, and $[d(s,90)/d(s,10)]^2 \div [d(s,90)-7] \leq 3.5$, preferably ≦3, especially ≦2.7, for example, ≦2.5, more especially ≦1.9 or ≦1.75, and in which d(s,90)>7 μm, d(s,90) and d(s,10) being measured in microns.

The present invention also provides a process for forming a coating on a substrate using a tribo-charging electrostatic fluidised bed, characterised in that the powder coating material used has a particle size distribution such that d(v,90) is no more than 42.5 μm, especially ≦42 μm, e.g. ≦41.5 μm or ≦41 μm, advantageously ≦40.5 μm, preferably ≦40 μm, advantageously ≦39 μm, especially ≦38 μm, more especially ≦36 μm, very especially ≦35 μm, and the content of sub-10 μm particles is no more than 12%, preferably ≦10%, advantageously ≦9%, especially ≦8%, very especially ≦7.5%, by volume.

We have further found that the sub-class of powders defined above which also has d(v,90)≦40 μm and a content of sub-10 μm particles no more than 10% is especially useful in providing improved stability of process operation (i.e. operation such that the mass of powder deposited on the substrate remains substantially constant over time). More especially d(v,90)≦36 μm, very especially ≦35 μm, and advantageously substantially 34 μm.

The preferred ranges given above are also valid for these embodiments.

The present invention also especially provides a process to establish a particle size distribution of a powder coating material suitable for application in a tribo-charging electrostatic fluidised bed process to provide improved process stability, which comprises (i) preparing a powder coating material of a known particle size distribution;

(ii) depositing powder material on a substrate or substrates using said powder material in a tribo-charging electrostatic fluidised bed process;

(iii) removing from the substrate or substrates and collecting at least part of said powder material deposited thereon;

(iv) measuring the particle size distribution of at least part of the collected powder material;

(v) comparing with the particle size distribution of the powder material used in the fluidised bed in step (ii), and (vi) repeating one or more times as necessary the sequence of preparation, deposition, removal, measuring and comparing steps, until there is obtained a powder coating material that when applied to a substrate by the fluidised bed process deposits powder material having a particle size distribution matching that of the powder material used in the fluidised bed.

Any suitable basis for comparing the particle size distributions may be used. Measurements based on volume or on surface area may be used.

In obtaining the improved results, we have found that the most critical part of the size distribution is the fine fraction, although desirably the whole size distribution corresponds to the size distribution of what is deposited. Thus, although it is important to match the fine fraction, the medium and coarse fractions should preferably also match, although there is greater freedom here.

In determining correspondence of the fine fraction, the content of the fines fraction is important, and we have found that this may conveniently be assessed by measurement of the sub-10 μm fraction, although other fractions may also be considered. By reducing the sub-10 μm particles, the sub-5 μm particles are also reduced. In determining correspondence of the medium fraction, conveniently the d(v,50) value is assessed, although the mean value for example may also be considered. The mean, also indicated as volume moment mean diameter, is the center of gravity of the distribution. The center of gravity of a mass (volume) distribution is defined by: XVM=_XdV/_dV where dV=X3dN: dV is the volume of dN particles of size X (Perry's Chemical Engineers' Handbook (7th Edition)). In determining correspondence of the coarse fraction, conveniently the d(v,90) or d(s,90) value is assessed, although other values, e.g. the d(v,95) or d(v,99) value, may alternatively be considered.

A variation of 2% by volume or less (as an absolute figure) in the fine fraction and preferably 6.5% or less, especially 5% or less, in the medium and/or coarse fractions should be mentioned. We have found that a difference of 2% or less in the content of sub-10 μm particles provides sufficient correspondence in the sub-5 μm particles, and substantial process stability is achieved. In addition, we have found that a difference of 6.5% or less, preferably 5% or less, in the d(v,90) value provides sufficient correspondence of the medium fractions. The Table below illustrates a powder to be prepared for use in a fluidised bed process according to the invention.

| Measure | Deposited powder | Preferred product tailored to correspond to deposited product | |
|---|---|---|---|
| % < 10 μm | X % | (X ± 2)% | e.g. (7 ± 2)% |
| d (v, 90) | Z μm | (Z ± 6.5%) μm | e.g. (30 ± 6.5%) μm |

For the sub-10 μm content the ±2% figure is applied directly to the measure, and does not represent 2% of X.

Thus, the expression a particle size distribution "matching" (or a particle size distribution corresponding to) is used herein preferably to indicate:—

1) a difference of 2% (by volume) or less in the content of sub-10 μm particles,
and preferably also 2) a difference of 6.5% or less, especially 5% or less, in the d(v,90) value, calculated on the powder deposited.

As explained, a suitable powder is arrived at by a sequence of preparation and testing procedures until comparison of the powder used and powder deposited shows the desired correspondence is achieved.

Without wishing to be bound by theory, we believe that for tribo-charging electrostatic fluidised bed processes, the processes leading to unstable process operation according to prior art methods are as follows:

On putting the powder coating material into the fluidised bed at rest, there is "no charge" on the powder. (This may not be strictly true as charge may be generated through loading the powder into the fluidised bed, and, because the decay of charge from powder coatings may take some time, the previous history of the powder may have an initial influence, but this initial charge may be disregarded in relation to the overall process.)

On switching on the fluidising air, particle-particle and particle-bed wall interactions begin, generating charge, the nominal sum of which should be zero as each collision generates two opposite charges. A poorly earthed fluidised bed is likely to generate a large charge from the tribostatic interaction of the powder coating with the walls of the vessel where the difference in material types gives a charge separation, the wall taking one charge and the powder the opposite charge.

There are two kinds of charge generation interaction: particle-particle (PP) and particle-wall (PW). Earthing of the fluidised bed allows the charge on its walls to leak to earth. Collisions of powder coating particles with the wall will also allow charge to leak to earth, at a finite rate, in the case of a fluidised bed apparatus with coated walls, due to the insulating nature of the fluidised bed wall when coated, and, more generally, in all cases, due to the finite time it takes for a charged particle to move from within the fluidised mass of powder to the earthed wall. There are thus charge generation processes (PP and PW) and charge-decay processes (recombination and earthing) which give rise to a dynamic equilibrium of charge within the fluidised bed, this equilibrium being a function of the powder coating type (chemistry, size, density) and the bed dimensions and operating conditions (available area of walls for charge leakage, fluidising air pressure, fluid density).

When the fluidised bed is at charge equilibrium, the introduction of an electrified part selectively removes certain charged powder coating particles. The type of particles removed (in terms of charge and size) is dependent upon the mobility of those particles and their ability to electrostatically adhere to the substrate and withstand displacement by other particles (e.g. by collisions). Removal of the coated substrate from the fluidised bed disturbs the equilibrium and the bed will attempt to re-equilibrate. Charge equilibration is possible through the processes described above in respect of the generation of powder charges.

As we have found, however, size equilibration is not possible. If the powder coating material removed from the fluidised bed onto the coating part does not have a particle size distribution that is representative of the particle size distribution of the bulk powder in the fluidised bed, there is a drift in the particle size distribution of the powder coating material remaining in the fluidised bed. In cases where the range in the sizes of particles removed from the bed onto the coated part does not correspond to the particle size distribution of the powder coating material in the fluidised bed, it is likely that the equilibrium charge attained by the bed after coating is different from that present prior to coating, because different size fractions of the powder coating are more or less able to hold charge, depending on their surface area and radius of curvature (both a function of particle size).

Typical powder coating materials available commercially have a $d(v,90)$ value of about 40 µm or greater and a sub-10 µm fraction of about 15 to 20% by volume at $d(v,90)$ values of around 40 µm, or possibly slightly lower at higher $d(v,90)$ values, e.g. in the 50 to 60 µm range. When such a material is applied by a tribo-charging electrostatic fluidised bed process, and a comparison is made between the powder deposited and the powder used in the fluidised bed, we have found that the powder deposited has a lower "top-end" particle size (measured for example by the $d(v,99)$ or $d(v,90)$ values) and a higher content of fine particles (measured for example as the sub-10 µm or sub-5 µm content) than has the powder of the fluidised bed. It might therefore be expected that better correspondence between the deposited powder and the fluidised bed would be achieved, and hence better process stability obtained, by adjusting the powder used to correspond more closely to the powder deposited in that process, which would involve an increased content of the sub-10 µm particles. However, we have found that, surprisingly, to arrive at the appropriate matching, or correspondence, it is necessary to reduce the content of fine particles, as measured, for example, by the content of sub-10 µm and/or sub-5 µm particles.

When a powder complying with the particle size distribution specified in the specified sub-class of preferred powders of the invention is used, we have obtained a corresponding particle size distribution in the powder deposited on the coated substrate. Thus, the problems associated with particle size drift (a change in coating properties with time, resulting from an equilibrium charge drift) are reduced or substantially eliminated More especially a "matched" powder may be obtained by the following sequence of steps:

1) providing a powder coating material of known particle size distribution,
2) carrying out a trial tribo-charging electrostatic fluidised bed process or processes using that powder coating material,
3) establishing a measure for the top-end particle size of the powder deposited in the fluidised bed process,
4) preparing from the same powder coating material of step 1 a powder with a top-end particle size that is closer to the top-end of the powder deposited in step 2,
5) carrying out a further tribo-charging electrostatic fluidised bed coating process using the powder prepared,
6) establishing a measure of the content of fines in the powder deposited,
7) preparing from the powder coating material of step 4 a powder with a reduced fines content in comparison with that measured in step 6),
8) carrying out a further tribo-charging electrostatic fluidised bed process using the powder, and optionally
9) repeating as necessary the sequence of preparation and deposition steps with adjustment of the top-end and/or fines content until the powder deposited matches the powder used.

By first setting a suitable top-end particle size and then reducing the fines content it is possible to establish a particle size distribution for a powder which will give a "matched" deposited particle size distribution and will give a substantially constant deposit over time.

The top-end of the powder deposited may be established in step 3 for example by carrying out the process with a powder that has a top-end above that expected to be deposited, and/or the process may if necessary be repeated with one or more powders of the same composition but different particle size distributions until increase in top-end particle size of the powder used produces no further increase in the top-end of the powder deposited. In each process tried, a series of substrates may be treated sequentially and the average value for the measure of the top-end may for example be taken. As already mentioned, the $d(v,99)$ measurement may be used to establish this top-end particle size. Advantageously, the powder coating material prepared after the first trial deposition step has a $d(v,99)$ which is ±6.5%, preferably ±5%, of the $d(v,99)$ deposited in the first trial deposition process (step 2), although it may also be possible to proceed using in step 5 a powder with a $d(v,99)$ which differs by up to 10% or up to 12%, for example, from the powder deposited in step 2. Ideally, when that powder of step 5 is subsequently used for preparation of the powder with reduced fines content (step 7), the top-end should remain substantially constant, although a wider tolerance is allowed here.

The powder with a reduced fines content may for example be obtained in step 7 by extensive classification processes or, more especially, by a bonding process carried out by mechanical fusion, whereby particles are bonded or combined together, with the fine particles being bonded preferentially. As already mentioned, ideally the top-end particle size should remain substantially constant in this step, although an increase is often unavoidable. However, we have found that bonding of fines allows the deposition of generally coarser particles, and hence an increase in the top-end deposited (for example in the deposited d(v,99)) is obtained. Thus, an increase of the top-end on bonding may not be a problem, although this should be minimised if possible, and preferably there should be no more than a 30%, preferably no more than about 20% or 25%, increase in d(v,99) on bonding.

Suitably, the fluidised bed process of any of the steps is carried out on a series of substrates and average measurements are taken for the powder deposited on the substrate, and for the powder in the fluidised bed. The number of substrates in the series may be, for example, 4 or more, preferably 10 or more, especially 20 or more, for example about 20 or 40 substrates. We have found that the deposit obtained at the start of the process, for example on the first substrate, may not be representative (and this is the case even when there is "matching" or correspondence of the powder and the deposit). It may therefore be useful to disregard the results of at least the first substrate and consider results of the second and/or later substrates, and more especially to consider results from a plurality of substrates excluding the first substrate or first 2 or 3 substrates. For example, 10 or more substrates starting from any of substrates 2 to 5 may be considered. When the number of substrates is high, the need to disregard the first substrate(s) is reduced. Thus, advantageously, the average of the first 40 substrates may be taken. Experimental error will also be reduced by averaging results for the powder in the fluidised bed, for example by utilising samples from the beginning, the middle and the end of the coating process for the substrates.

It has been found that the use of a powder designed in this way results in a substantially stable operation of the fluidised bed process over time, giving consistent results over time and minimal powder wastage. Surprisingly, we have found that when the powder deposited on a series of panels as defined above corresponds, as defined, to the bulk powder in the fluidised bed, there is substantially no drift of particle size distribution in the powder deposited when the coating process is carried out on a commercial scale with a significantly higher number of panels, for example over a period of days, with coating of, for example, several hundred panels.

The present invention also provides the use, in a tribo-charging electrostatic fluidised bed coating process, of a powder having the particle size distribution thus established. Usually the process will be operated under substantially the same conditions used in establishing the matched particle size distribution, and especially at substantially the same voltage as used in establishing the matched particle size distribution. As will be understood also, fluidised bed processes are commonly operated with a fluidising additive, and of course the additive used in the process for establishing the matched particle size distribution will generally be that intended for commercial use. Suitable additives are for example a mixture of aluminium oxide and aluminium hydroxide as disclosed in WO 94/11446. An example is a mixture of aluminium hydroxide (mean particle size 0.8 µm) and aluminium oxide (mean particle size <2 µm) in a weight ratio of 55:45, added to the powder in an amount of 0.6% by weight calculated on the weight of the powder without additive.

Powders within the preferred sub-class of powders of the invention, that is those having d(v,90)≦40 µm and a content of sub-10 µm particles of ≦10%, give improved process stability. By employing the especially preferred sub-class of powders of the invention, that is those having d(v,90)≦36 µm, advantageously ≦35 µm, and a content of sub-10 µm particles of ≦10%, we have obtained a substantially constant deposit over time when the process is carried out on a commercial scale. Voltages of 2 kV were used. Other powders within the preferred subclass, that is, those with d(v,90)≦40 µm but >36 µm, may be employed when the process is operated under different conditions, more particularly at higher voltages.

More especially, the powder will have a d(v,90) of substantially 34 µp and a sub-10 µm fraction ≦8%, e.g. ≦7.5%, especially ≦7%, by volume. A powder having a d(v,50) of ≦25 µm, preferably ≦22 µm and/or a sub-5 µm fraction ≦2.5 µm by volume should especially be mentioned. The d(v,99) may for example be ≦50 µm, for example ≦44 µm, for example in the range of from 40 to 45 µm.

Advantageously, a data source of particle size distributions for powders deposited in tribo-charging electrostatic fluidised bed processes may be assembled, and a powder for use in a particular tribo-charging electrostatic fluidised bed process may be prepared by reference to that data source, reference being made in general to data for a powder of the same chemistry (the same resin binder system) and preferably a similar composition. Thus, for example, such a data source may be referred to instead of carrying out one or more sequences of preparation, deposition, removal, measuring and comparing. Thus, for example, the particle size distribution of the coating material prepared initially (step (i)) may be selected by reference to powders deposited in known fluidised bed processes, and the sequence of steps (ii) to (v) is then carried out, or the process may be begun by preparation of a powder having a top-end close to that known to be the maximum deposited in tribo-charging fluidised bed processes operated under the conditions to be used, and the fines content reduced (step 7). Alternatively, a powder coating material of a particular particle size distribution expected to give correspondence with the deposited particle size distribution when it is used may be prepared by reference to data for known fluidised bed processes and the suitability of the particle size distribution obtained for the particular fluidised bed process to be used may be checked by the sequence of deposition, removal, measuring and comparing steps to ensure that, when applied to a substrate by the intended process, the powder coating material deposited has a particle size distribution corresponding to that of the material used in the fluidised bed. Thus, a single preparation, deposition, removal, measuring and comparing sequence may be carried out and used as a means of checking the suitability of the powder prepared for use in the intended fluidised bed process.

The above methods have allowed us to identify a particle size distribution for a powder that is especially suitable for application in a tribo-charging electrostatic fluidised bed process. The powder coating material thus identified may then be used to coat a substrate by a tribo-charging electrostatic fluidised bed process carried out under the same or similar conditions to those used to obtain the desired particle size distribution. We have found that the powder may also be used over a range of conditions and gives excellent results. However, if very different process conditions are to be used, more particularly a significantly higher voltage (where for example a higher d(v,90) may be suitable), the particle size distribution requirements for the powder may be different and/or may need to be modified for optimum results, and the invention allows these particle size requirements to be identified.

A number of methods may be used for the adjustment of particle size distribution to give the desired results. Thus, for example, classification or mechanical fusion processes may be used in the identification of the optimum particle size distribution when the fines content is to be reduced, and such processes or other processes may be used for larger-scale manufacture when the optimum particle size distribution is known.

Powders used in the process of the invention may comprise single particles or clusters. They may be obtained, for example, by classification or by agglomeration methods, for example by mechanical fusion, spray drying or melt atomisation methods, the conditions being specifically selected to produce powders of the required particle size distribution. Agglomeration processes leading to composite particles are described, for example, in EP 372860 A and EP 539385 A, and melt atomisation processes are described, for example, in U.S. Pat. No. 5,461,089. However, the specific agglomeration processes carried out in those applications do not lead to powders having the particle size distribution required by the present invention. Our copending application with the title Powder Coatings Materials (Inventors Ring, Spencer, Cordiner) filed concurrently herewith describes a class of powders including those complying with the requirements of the present invention, and processes for making them.

Agglomeration is normally performed at a specified temperature relative to the Tg of the system. This temperature is usually defined by the degree of agglomeration required (the more agglomeration required, the higher the temperature). In general, for example, mechanical fusion may be carried out at or just above the glass transition temperature (Tg) of the film-forming polymer. (In certain melt atomisation processes, however, for example that of U.S. Pat. No. 5,461,089, temperatures greatly in excess of the Tg may be used for the granulation, for example temperatures in excess of Tg+100° C.)

In (macro-)agglomeration processes, such as described in EP 372860, individual particles in the agglomerates are bonded or at least partially fused together such that the composites, or clusters, formed do not break down under the mechanical and/or electrostatic forces associated with their application to a substrate. An agglomerate consisting of particles of cluster structure (otherwise referred to as "bonded particles") may, for example, be prepared by mechanical fusion, for example by mechanical fusion at a temperature in the range of from 45 to 75° C. For any given starting powder, the precise particle size distribution of the agglomerated powder will depend on a number of factors, for example, for mechanical fusion, the temperature of, and time for, the mechanical fusion operation, the rate of heating, the Tg of the film-forming polymer, the free space inside the mechanical fusion device, and the shear force in the mechanical fusion device (determined by the power/current used).

For example, a mechanical fusion agglomeration to prepare a powder of the present invention may be carried out using a heater temperature close to the Tg of the film-forming polymer present in the powder, for example with the heater at the Tg temperature, or in the range of up to 10° C. below the Tg, e.g. up to 5° C. below the Tg, to 15° C., e.g. up to 8° C., above the Tg.

The free space within the equipment is advantageously kept to a minimum so the vessel is filled to the brim. This is to improve the efficiency of the process—less material means less particle-particle interaction and it is this interaction that generates the heat (for larger systems), heat being required for the fusion-agglomeration (bonding). The blade speed is normally continuously altered (by hand or by computer control) both in order to obtain a suitable heating rate and to hold the maximum temperature for the required time. The faster the blade, the higher the rate of temperature increase.

The powder may be heated, by means of the external heater and by the mixer blade, up to a maximum temperature in the range of from the Tg of the powder (i.e. Tg midpoint) to 15° C. above the Tg (the higher temperatures being for example suitable for heavily filled powders), preferably from the Tg to Tg+10° C., especially from the Tg to Tg+8° C., for example from the Tg to Tg+5° C., or from the Tg to Tg+2° C. The powder may then be cooled immediately, or may be held at the maximum temperature for a short period, e.g. for up to 5 mins, especially up to 2 mins, although at lower temperatures longer times may be possible, for example up to 20 mins. To increase the bonding, either a higher temperature or a longer time (at the maximum temperature and/or above the Tg and/or a longer overall time before cooling) is used. Suitably, the powder may be heated to a temperature in the range of Tg to Tg+4° C. and maintained at that temperature for a period of 0 to 2 mins, or for example it may be heated to a maximum temperature of Tg of the powder and held at that temperature for 0 to 2 minutes, the overall time between the beginning of heating and cooling being substantially 30 minutes.

Overall, the heating process may take, for example, up to 120 mins, especially no more than 60 mins, and generally more than 5 mins, more especially at least 10 mins, often at least 20 mins, for example about 30 to 40 mins. The powder may be at a temperature at or above its Tg for a time of, for example, 2 mins, for example 5 mins, or more.

Agglomeration can be carried out under conditions that will decrease the content of sub-10 μm particles and decrease the $[d(s.90)/d(s10)]^2 \div [d(s90)-7]$ value, and give a relatively low increase in d(v,90). Increasing time at a lower temperature may also be advantageous. The time will, of course, be adjusted according to the temperature used and other conditions, relatively gentle conditions being selected to ensure preferential bonding of the finer particles, that is to minimise increase in size of the larger particles. This contrasts with the process of EP 372860, where agglomeration is carried out on powder mixtures of low mean particle size specifically to increase the mean particle size. In EP 539385A, also, no attempt is made to minimise the increase in mean or higher particle size, the aim being simply to combine different components in a flexible mixing scheme and provide a permanent fixing for such components in the powder, while also ensuring that the powder is suitable for application by commercial electrostatic spray gun. The latter specification states that powders for this purpose generally have a particle size distribution between 10 and 120 μm with a mean particle size in the range of from 15 to 75 μm.

We have found, however, that by gentle conditions with a generally slower rate of heating, an increase in the larger particle sizes can be minimised while still ensuring the bonding of fines. Thus, although bonding increases the d(s,10) value and also the d(s,90) value, and decreases the sub-10 μm fraction but also increases the d(v,90) value, by using gentle conditions, we have found that it is possible to obtain preferential bonding of the finer particles so that there is a relatively greater increase in the d(s,10) value than in the d(s,90) value, and a relatively greater reduction in the sub-10 μm fraction than there is an increase in the d(v,90) value, and by selecting powders such that d(v,90)≦42.5 μm, and the sub-10 μm content is ≦12% and/or $[d(s,90)/d(s,10)]^2 \div [d(s,90)-7] \leq 3.5$ powders are obtained that have the especial advantages mentioned above.

Thus, for example, the heating conditions may be set by adjustment of the heater temperature and blade speed so as to heat the powder to the desired temperature at a relatively low rate, especially over the temperature range approaching the Tg or the desired maximum temperature, more especially over at least the last 3° C. up to the maximum temperature. For example, from a temperature about 10° C. to 5° C. below the Tg up to the maximum final temperature, or from a temperature 15° C. below the final temperature, to that final temperature, the heating rate is advantageously kept low. The rate of heating at least during that time may, for example, be ≦4° C. per min, preferably ≦3.5° C. per min, especially ≦3° C. per min, very especially ≦2.5° C. per min, advantageously ≦2° C. per min, e.g. 1° C. per min, the higher rates, if used, being preferably used at lower temperatures. Thus, for example, heating may be carried out at a rate of about 1 to 2° C. per minute at temperatures in the range 4 to 7° C. below the final temperature up to the final temperature, especially over the final 5° C. before the desired temperature is reached. Adjustment of conditions can be carried out automatically on larger machines. If desired, the temperature increase to the desired final temperature may be carried out in stages, with the very final heating rate, e.g. from a temperature 2 to 3° C. below the Tg up to the final temperature, being reduced, e.g. to give a temperature rise of only about 1° C. per minute. In general, higher heating rates near the maximum would usually only be used with a lower maximum temperature (and therefore usually longer holding times at that maximum temperature). When the maximum temperature is reached, the conditions are then suitably adjusted to cool the powder or to maintain the temperature constant for the desired period, e.g. for 2 mins, followed preferably by cooling, cooling being carried out, for example, with a low speed of agitation, for example over a period of about 5 to 15 minutes. In contrast to the use of these gentle conditions, a substantially higher heating rate, for example of 5 C per minute or more, as in EP 539385A, would provide powders with too high a d(v,90) and too high a $[d(s,90)/d(s,10)]^2 \div [d(s,90)-7]$ value.

In an alternative embodiment the coating material is prepared in a liquid carrier, and the liquid carrier is subsequently removed and the particles combined into larger particles to form a powder coating material of the required particle size. Advantageously an aqueous dispersion is prepared and spray-dried to remove water and bring about a combination of the particles into larger particles. Our copending application, WO 2007/006779, filed concurrently herewith describes methods for combinations of particles by this means.

Preparation of the Liquid Composition May be Carried Out by Various Means known in the art, including those for the production of aqueous coatings, for example wet grinding (as described, for example, in WO 96/37561 and EP-A 0 820 490), phase inversion emulsification (as described, for example in WO 00/15721), melt dispersion (as described, for example, in WO 97/45476 and WO 01/60506), jet-dispersion (as described, for example, in EP-A 0 805 171) or for example by emulsion polymerisation. Preferably, the liquid carrier is water, and the composition is preferably a dispersion or emulsion.

Preferably, the liquid composition is prepared by emulsification, suitably in the presence of a dispersing agent having functional groups capable of reacting with the film-forming material. Alternatively, or additionally, neutralising agents can be used which can form hydrophilic ionised functional groups (e.g. carboxylic groups, sulphonate groups and/or phosphonate groups) which are present in the resin and/or crosslinker.

Liquid compositions prepared by phase inversion emulsification, especially by phase inversion extrusion, should especially be mentioned. In the latter process polymer melts are processed using an extruder, preferably a twin-screw extruder, to disperse such a substance in an aqueous medium. Preparation of Aqueous Powder Coating Dispersions Prepared by Phase inversion extrusion are described in WO 01/28306 and WO 01/59016.

Suitably the solids content of the liquid composition is at least 5%, preferably at least 10%, especially at least 30%, more especially at least 40%, by weight, and for example up to 70%, e.g. up to 60%, by weight, although up to 95% be weight may be possible in the case of a very dense material. High solids contents can be handled more easily if the average particle size is above 80 nm.

Removal of liquid carrier may be carried out by drying, filtration, centrifugal separation, or by evaporation, or any combination of such means.

Separation by drying is preferably done by spray-drying, although other drying techniques, for example rotary drying and freeze drying, may be used if so desired. Suitably therefore the liquid carrier may be spray-dried, with simultaneous combining of the particles into larger particles of the required particle size. We have found that in the spray drying process the particle size can be controlled by the atomisation process and the water content as, we believe, the solids content of each atomised liquid droplet dries to form an individual powder particle. Increase in atomisation pressure, decrease in orifice dimensions, decrease in solids content of the liquid feed and/or decrease in the feed rate decreases the particle size of the powder produced. It has been found that the equations of Elkotb in Proceedings of ICLASS, 1982, pages 107-115, and those of Lefebre in Atomisation and Spraying, 1999, page 233, can be applied to predict the atomisation performance and give good correlation to the powders produced by spray-drying.

Spray-drying may be carried out, for example, using an inlet air temperature up to up to 220° C., often up to 200° C., for example up to 180° C. A suitable minimum is, for example, 80C, and an inlet temperature in the range of from 100 to 280° C., often 150-200° C. should especially be mentioned. The outlet temperature may be, for example, in the range of from 20 to 100° C., more especially 30 to 80° C., preferably in the range of from 55 to 70° C., e.g. substantially 55° C., 65° C., or 70° C.

In an alternative embodiment, drying may be carried out, for example, by freeze-drying, e.g. by lyophilisation, and if a drying method such as this is used which does not lead to combining into larger particles, the particles produced are agglomerated subsequently, for example by mechanical fusion, to produce the required particle size distribution.

Processes involving the drying of a powder coating material prepared in a liquid carrier are described in our copending application with the title Process for preparing a powder coating composition (Inventors Morgan, Koenraadt, Beijers, Kittle) filed concurrently herewith. Without wishing to be bound by theory, we believe that, in contrast to the macro-agglomeration processes of EP 539385 A, in the micro-agglomeration spray-drying process of our concurrently filed application the solids within each spray droplet can form a discrete powder particle so that, it is believed, the powder comprises a substantial proportion of substantial spherical non-homogeneous single particles formed by a fusion-agglomeration process, although some cluster (macro-composite) structures appear also to be formed, it is believed by recirculation of particles in the spray zone of the spray dryer. The discrete particles, micro-composites, formed by the micro-agglomeration process appear to have a smooth surface and to be generally spherical in shape, in contrast to discrete particles produced for example by jet-milling.

Accordingly, the present invention especially provides a powder coating material in which the powder particles have been formed by a fusion-agglomeration process and in which
a) $d(v,90) \leqq 42.5$ µm, and
b) i) the percentage of particles $\leqq 10$ µm in size is $\leqq 12\%$ by volume, and/or
ii)

$$\frac{[d(s, 90) \div d(s, 10)]^2}{[d(s, 90) - 7]} \leq 3.5,$$

$d(s,90)$ being greater than 7 µm, and $d(s,90)$ and $d(s,10)$ being measured in microns,
and to such a powder coating material for use in a tribo-charging electrostatic fluidised bed process.

The powder coating may be formed by a fusion-agglomeration process, such as a mechanical fusion process.

More especially, the powder comprises composite particles in which individual particles are fused or bonded together to form clusters that do not break down under the mechanical and/or electrostatic forces encountered on application to a substrate, and/or comprise discrete substantially spherical particles formed by a fusion-agglomeration process.

In one embodiment the mechanical fusion process is carried out by formed by spray drying an aqueous emulsion or dispersion of the powder coating material. This may lead to essentially single, generally spherical particles.

In another embodiment, the powder coating material is prepared by air classification.

In the clusters, individual particles are combined, but remain separately identifiable in the cluster. In discrete particles, in contrast, complete fusion has taken place so that a single, substantially spherical particle is formed. In contrast to conventional powders, where the end product is the result of milling and classification to remove oversize particles and fines, there is no need for a classification process to remove fines, although of course such a process may be carried out before the fusion-agglomeration if desired.

The powder to be agglomerated may, for example, be a unitary powder (also referred to as "single component"). The powder is usually derived from a single extrudate or obtained, for example, by extrusion of the same components in the same proportions, followed by comminution. Alternatively, two different powders may be mixed prior to agglomeration. These may be of the same or different chemistry and/or colouration. The powder to be agglomerated may, for example, be mixed with a powder which is preferably of substantially identical composition. Thus, the powder to be agglomerated may comprise particles of substantially uniform composition. Powders for admixture may or may not have the same particle size distribution.

Advantageously, preparation of a powder with a reduced fines content during the above process to establish a suitable particle size distribution, and preparation of a powder for commercial use when a suitable particle size distribution has been established, is carried out by bonding.

It is convenient to use for bonding a powder with a $d(v,90)$ which is slightly less than that of the powder to be produced because this value can increase on bonding. However, we have found it possible to carry out the process such that the finer particles are bonded preferentially, and any increase in $d(v,90)$ is relatively low. In comparison with bonding processes such as those described in EP 0372860 A, a relatively gentle bonding process should be used, using, for example, a lower temperature and/or lower rate of heating.

Thus, for example, preferably the powder to be bonded has a $d(v,90)$ which differs from the desired $d(v,90)$ by less than 10 µm, for example by less than 8 µm, and/or preferably by 20% or less. Bonding of powders having a $d(v,90)$ in the range of from 26 to 30 µm, for example 28 to 29 µm, should especially be mentioned. Desirably the final powder has a $d(v,90)$ value in the range of from 34 to 37 µm.

Thus, we have found that in agglomeration it is possible to decrease the content of particles 10 µm or below by, for example, over 16% by volume, and that, although there is necessarily an increase in mean particle size as a result of the removal of fine particles, and usually an increase in $d(v,90)$ as a result of some particles adhering to the larger particles, such increases can be made lower than expected for an agglomeration process. Thus, a powder with a substantially reduced content of particles 10 µm or below in size and with a narrow particle size distribution can be obtained.

An agglomeration process may be carried out one or more times. Thus, for example, after an agglomeration process the $d(v,90)$ value and the sub-10 µm fraction or the $d(s,90)$ and $d(s,10)$ values may be measured and if necessary agglomeration may be continued or repeated until the desired powder is produced. Alternatively, for example, one or more reference processes may be carried out in which the particle size distribution in the agglomerated powder is checked to establish a starting powder and process conditions producing, from that starting powder, an agglomerated powder having the desired parameters.

Non-bonded (non-agglomerated) particles may also be used in the processes of the invention.

Thus, preparation of a suitable powder coating material may include, for example, a comminution step, and, if desired, a classification step. For example, the process may comprise melting and kneading a raw material for the powder coating and producing pellets or chip therefrom, grinding into pulverised particles; and optionally combining or agglomerating the pulverised particles.

Further, powder coating materials of the invention may be obtained by a process comprising:
melting and kneading a raw material for a powder coating material and producing pellets or chip therefrom, wherein the raw material comprises a synthetic resin and at least one further ingredient selected from pigments and additives;
grinding the pellets or chip into pulverized particles; and classifying the pulverized particles and/or agglomerating the resulting powder to produce a powder comprising composite particles in which individual particles are fused or bonded together to produce the desired particle distribution; the process conditions or the end point of the process being determined so as to give a particle size distribution in which
a) $d(v,90) \leqq 42.5$ µm, and
b) i) the percentage of particles <10 µm in size is $\leqq 12\%$ by volume, and/or
ii)

$$\frac{[d(s, 90) \div d(s, 10)]^2}{[d(s, 90) - 7]} \leq 3.5,$$

$d(s,90)$ being greater than 7 µm, and $d(s,90)$ and $d(s,10)$ being measured in microns.

Usually an agglomeration or combining step is carried out after classifying to remove over-sized particles.

Powder coating materials suitable for use in the process of the present invention may be prepared by a process in which particles of a powder base composition are combined, or agglomerated, into larger particles, the agglomeration conditions or the end point of agglomeration being determined so as to give a particle size distribution in which:

a) $d(v,90) \leqq 42.5$ μm, and b) i) the percentage of particles <10 μm in size is $\leqq 12\%$ by volume, and/or ii)

$$\frac{[d(s, 90) \div d(s, 10)]^2}{[d(s, 90) - 7]} \leq 3.5,$$

d(s,90) being greater than 7 μm, and d(s,90) and d(s,10) being measured in microns.

An agglomeration (or bonding) step can, surprisingly, be operated to produce a powder in which the d(v,90) is not substantially increased over the d(v,90) of the starting material. This is very valuable because, in applications such as the process of the invention, the use of powders of lower d(v,90) would be advantageous; however, previously, such fine powders have had major handling and application problems. The present invention permits the effective use of fine powders with improved handling and application characteristics. In effect, for a given average or top-end particle size, powders having the particle size distribution defined in the present invention show improved characteristics over powders of the same average or same top-end particle size not having the particle size distribution defined in the present invention.

As well as showing improvements in penetration power, evenness of coating and coating speed, and (for the preferred sub-class of powders) improvements in process stability, powders as defined above show improved application properties when used in the above-specified fluidised bed processes compared with those of comparable maximum particle size values, as demonstrated, for example, by measurement of the fluidity of the bulk powder.

Various methods of measuring fluidity are possible. One conventional method calculates an Aeration Index. In this method, an instrument (typically a Freemantech FT3) measures energy contained in a sample of powder at zero airflow and subsequently at a variety of measured airflows. The Aeration Index is equal to the energy measured at zero airflow divided by the energy measured at a defined airflow. Depending upon the situation, however, the Aeration Index can be heavily dependent upon the errors in the denominator, and therefore a better measure is the difference in energy between two measurement points to give an aeration gradient. Another method utilises the Hausner ratio. Information on the Hausner ratio (the ratio of the tapped density to aerated bulk density) and on its use as a fluidisability index can be found in the book "Powder Coating Testing: Methods of measuring the physical properties of bulk powders" by Svarovsky, published by Kuwer Academic Publisher, October 1987, sections 3.2 and 5.2.4. The lower the Hausner Ratio, the more fluidisable the powder and the better its handling and application properties. For example, because of reduced cohesiveness, equipment becomes easier to clean. Many powders used in the process of the present invention have Hausner Ratios below 1.4 (and so are classified as non-cohesive), even without special flow additive, and a number have Hausner Ratios below 1.35.

Use of the powders as defined in the present invention also offers a number of other advantages compared with the prior art.

The process of the present invention also gives a reduced "orange peel" effect in the applied coating, which is of considerable importance for the production of coatings where very high flow, smooth films are required, for example for primer coatings in the automotive field.

In addition, in comparison with the prior art, the processes of the present invention give better consistency in finish or colour across an article and from article to article. Inconsistencies in thickness from article to article can lead, for example, to perceived differences in aesthetics, especially, for example, in ceiling tiles which are viewed at a low angle. The processes of the present invention allows improved control of film thickness and hence greater consistency in deposition from article to article.

Powders used in the processes of the invention may be formulated using more highly functional materials or more viscous materials that would otherwise lead to unacceptable reduction in flow and leveling. They may also have a high level of pigment, and incorporation of those pigments having severely detrimental effect on flow and appearance may become possible. Appearance may be maintained even with compositions based on resins having short gel times, which would normally reduce flow.

The powder coating compositions may contain up to 20%, or more, of filler. Addition of filler facilitates manufacture and provides tougher coatings, as well as leading to a reduction in cost, but even 5% of filler added to a conventional powder would give an unacceptable appearance in the final coating. The addition of 10 to 20% or more of filler to a powder suitable for use in the present invention to provide a coating with high surface hardness and acceptable flow and gloss should especially be mentioned.

Powder coating materials used in the processes of the present invention may be mixed with one or more fluidity-assisting additives (a "post-blending process"). Such additives (also called flow aids), and their use, are well known in the field of powder coatings and include, for example, aluminium oxide (alumina) and hydrophobic or hydrophilic silica. Preferably, however, those additives disclosed in WO 00/01775 or in WO 94/11446 are used. The disclosures of those documents are herein incorporated by reference.

A preferred fluidity-assisting additive is the preferred additive combination disclosed in WO 94/11446, comprising aluminium oxide and aluminium hydroxide, preferably in proportions in the range from 30:70 to 70:30. Another preferred fluidity-assisting additive is the preferred additive combination disclosed in WO 00/01775, namely a wax-coated silica, optionally in combination with aluminium oxide and/or aluminium hydroxide. Where wax-coated silica is used in combination with alumina, the ratio between these materials is preferably 70:30 to 30:70. Where wax-coated silica is used in combination with aluminium hydroxide the ratio between these materials is preferably 80:20 to 50:50. Where a combination is used of wax-coated silica, aluminium oxide and aluminium hydroxide, the relative proportions of the additives preferably are as follows: 10-30 wt. % of wax-coated silica, 20-85 wt. % of alumina, and 1-55 wt. % of aluminium hydroxide, all calculated on the total of the three components.

Other post-blend additives which may be mentioned include aluminium oxide and silica also (hydrophobic or hydrophilic), either singly or in combination.

The amount of fluidity-assisting additive(s) incorporated by dry blending may be in the range of from, for example, 0.05 or 0.1 to 5% by weight, based on the total weight of the composition without the additive(s).

Each fluidity-assisting post-blended additive is generally in finely divided form and may have a particle size up to 5 microns, or even up to 10 microns in some cases. Preferably, however, the particle size is not greater than 2 microns, and is more especially not greater than 1 micron.

When the fluidity-assisting additive comprises two or more products it is strongly preferred for at least this component to be pre-mixed, preferably intimately and homogeneously by a high shear technique, before being blended with the composition. The case where the post-blend additive includes wax-coated silica, and that material is incorporated and post-blended separately, should also be mentioned.

The term "post-blended" in relation to any additive means that the additive has been incorporated after the extrusion or other homogenisation process used in the manufacture of the powder coating material, and in the case of agglomerated powders, after the agglomeration process. Post-blending of an additive may be achieved, for example, by blending in a "tumbler" or other suitable mixing device or by introduction into the fluidised bed itself.

In the tribo-charging electrostatic fluidised bed process of the invention, the electrical energy may be applied to the system in a number of ways, for example by applying a voltage to the substrate; by applying a voltage to the fluidising chamber of the fluidised bed; or by applying a voltage to an electrically conductive electrode positioned in the fluidised bed in such a position relative to the substrate that the extent to which charged particles adhere to regions of the substrate is influenced by the electrode.

In a first preferred embodiment, a voltage is applied to the substrate for at least part of the period of immersion. In this embodiment, the substrate is most suitably made of a conducting material, for example metal, e.g. aluminium or steel. In a second preferred embodiment, the fluidised bed includes a fluidising chamber at least a part of which is conductive, and a voltage is applied to the conductive part of the fluidising chamber. In this embodiment, the substrate is suitably either electrically isolated or earthed, and may be conductive, for example metal such as steel or aluminium, or may be non-conductive or poorly conductive, for example medium density fibre-board, wood, wood products and plastics materials, for example plastics materials including electrically conducting additives, polyamide, and highly insulating plastics materials, for example polycarbonate. In both of these embodiments, the process is carried out under conditions which ensure that there are no ionisation or corona effects in the fluidised bed, and particles of the powder coating composition are preferably charged by friction alone.

In these embodiments, the voltage applied to the substrate or to the conductive part of the fluidising chamber or to the electrodes placed in a position to influence deposition is preferably sufficient to attract the frictionally charged powder coating particles to the substrate while resulting in a maximum potential gradient that is insufficient to produce either ionisabon or corona effects in the fluidised bed of powder coating composition.

Since the voltage applied to the substrate or to the conductive part of the fluidising chamber or to the electrodes placed in a position to influence deposition is insufficient to produce either ionisation or corona effects in the fluidised bed of powder coating material, the substrate is, in effect, electrically isolated and there is effectively no current flow in the substrate. If there is any current flow, it is anticipated that it is unlikely to be more than 10 mA, probably unlikely to be more than 5 mA and expected to be less than 1 mA and more likely to be of the order of a few microamps; that is, the current is, in practice, expected to be too small to be measured by conventional current-measuring instruments.

The voltage applied is preferably a direct voltage, either positive or negative, but an alternating voltage is also usable in principle. The applied voltage may vary within wide limits according, inter alia, to the size of the fluidised bed, the size and complexity of the substrate (workpiece) and the film thickness desired. On this basis, the applied voltage will in general be in the range of from 10 volts to 100 kilovolts, both positive and negative when a direct voltage is used.

In each case, ionisation and corona conditions may be excluded by so selecting the voltage range according to the spacing of the substrate from elements of the apparatus as to cause a maximum potential gradient below 30 kV/cm, the ionisation potential gradient for air at atmospheric pressure, when air serves as the gas in the fluidised bed, operation usually being at atmospheric pressure. Either nitrogen or helium, for example, instead of air, could serve as the gas in the fluidised bed and, for operation at about atmospheric pressure, a maximum potential gradient below 30 kV/cm would be suitable for use with those gases.

When a voltage is applied to the substrate, it may be applied before the substrate is immersed in the fluidised bed and not disconnected until after the substrate has been removed from the bed. Alternatively, the voltage may be applied only after the substrate has been immersed in the fluidised-bed. Optionally, the voltage may be disconnected before the substrate is withdrawn from the fluidised-bed.

Advantageously, if a voltage is applied to the substrate, the fluidised bed is provided with an electrical connection, serving as the source of the reference or "earth" voltage for the remainder of the apparatus. If no connection is provided, it may be found that the coating performance of the fluidised bed deteriorates more quickly than would otherwise be the case. For safety reasons, the fluidised bed is, preferably, connected to the earth terminal of the electrical mains supply (referred to as an earth connection) energising the apparatus.

In these first and second embodiments, one or more counter-electrodes, preferably connected to the earth terminal of the electrical mains supply energising the apparatus, are disposed within the bulk of the fluidised powder coating composition. The counter-electrodes may be charged instead of being connected to the earth terminal of the mains supply. The counter-electrodes serve to improve the efficiency of the process according to the invention, in the coating of a substrate with recesses, for example, by so modifying the electric field within the recesses, on insertion into the recesses, as to cause greater penetration of the electric field into the recesses, thereby effecting an increase in the amount of powder attracted into the recesses. Care is taken to ensure that separations between the counter-electrodes and the substrate in relation to the voltage applied to the substrate are always such that the maximum potential gradient between a counter-electrode and the substrate lies below 30 kV/cm, the ionisation potential for air at atmospheric pressure, when air at atmospheric pressure serves as the gas in the fluidised bed. That is, the process of the invention continues to be conducted without ionisation or corona effects in the fluidised bed when counter-electrodes are used.

In the case in which a direct voltage of a given polarity is applied to the substrate or the fluidising chamber, electrostatic forces will tend to attract predominantly oppositely-charged powder coating particles onto the substrate in accordance with the conditions set out above in respect of the generation and regeneration of charged particles.

Advantageously, in a process according to the invention for coating successive substrates in sequence, direct voltage is used and a single polarity (for example+ve) is used or the polarity of the voltage is reversed from each substrate to the next so as to produce an alternating sequence.

A further process variant taking account of the bipolar charging of the powder particles comprises the simultaneous batchwise coating of one or more pairs of substrates disposed within a common fluidised bed, the substrates of each pair being charged by direct voltages to respectively opposite polarities. In that process variant, the walls of the fluidising chamber are connected to the earth terminal of the mains supply and there may be provided one or more counter-electrodes, connected to the earth terminal of the mains supply, to establish a specific configuration of the electric field among the oppositely-charged substrates and the fluidising chamber.

A series of substrates of single polarity or alternate polarities may be transported through a fluidised-bed established within a fluidising chamber having walls composed alternately (in the direction of travel of the substrates) of insulating sections and conducting sections. The conducting sections of the fluidising chamber would usually be held at different voltages in order to provide different conditions in the respective sections of the chamber but it will be understood that the conductive sections would, in some circumstances, all be connected to the earth terminal of the mains supply.

In a variant of this continuous process, the single-charged or alternately charged substrates are transported in sequence past an array of counter-electrodes (preferably connected to the earth terminal of the mains supply) disposed within the fluidised-bed. These continuous processes offer benefits which are similar in principle to those of the individual coating of successive substrates of alternate polarities and the simultaneous coating of pairs of substrates of respectively opposing polarities.

In a third preferred embodiment, a voltage is applied to an electrically conductive electrode positioned in the fluidised bed in such a position relative to the substrate that the extent to which charged particles adhere to regions of the substrate is influenced by the electrode. In this embodiment, the substrate is suitably either electrically isolated or earthed; the substrate is preferably poorly- or non-conductive, and may for example be medium density fibre-board, wood, wood products and plastics materials, for example plastics materials including electrically conducting additives, polyamide, and highly insulating plastics materials, for example polycarbonate. The process is carried out under conditions which ensure that there are no ionisation or corona effects in the fluidised bed, and particles of the powder coating composition are charged by friction alone.

The electrode exerts its influence over a region of the substrate and influences the coating of the said region in accordance with the proximity of the electrode to the region and the voltage applied to the electrode. One arrangement of suitable apparatus includes a second electrode to which is applied a voltage that is of polarity opposite to the first-identified voltage, the first-identified electrode and the second electrode being on opposite sides of the substrate and the second electrode being positioned to influence the extent to which charged particles adhere to a region of the substrate, and means for applying a voltage of the opposite polarity to the second electrode. Another arrangement includes at least one further electrode adjacent to the first-identified electrode, the further electrode or electrodes being positioned to influence the extent to which charged particles adhere to a respective region of the substrate or respective regions of the substrate, and means for applying a voltage of the same polarity as the first-identified voltage to the further electrode or electrodes.

The spacing between the electrode or electrodes and the substrate and the voltages applied to the electrode or electrodes are preferably such that, in operation, ionisation or corona conditions are not established in the apparatus. By way of example, the spacing between the electrode or electrodes and the substrate may be 10 cm and the voltage applied to the electrode or electrodes may be 5 kV, resulting in a potential gradient of 0.5 kV/cm, which is well below the potential gradient required for ionisation or corona conditions.

In a particular arrangement, the first-identified electrode and a plurality of further electrodes may be arranged in the form of a "shell" which at least partly encloses the substrate. Such a shell may be continuous or discontinuous. In yet another arrangement, the first-identified electrode forms a shell for the substrate.

In this third embodiment, the fluidised bed may in addition include a fluidising chamber at least a part of which is conductive, a voltage being applied to the conductive part of the fluidising chamber.

Air at atmospheric pressure usually serves as the gas in the fluidised bed but other gases may be used, for example, nitrogen or helium. The substrate will usually be wholly immersed within the fluidised bed.

The preferred period of immersion of the substrate will depend on the size and geometrical complexity of the substrate, the film thickness required, and the magnitude of the applied charge and will generally be in the range of from 10 seconds to 5 minutes.

Preferably, the substrate is moved in a regular or intermittent manner during its period of immersion in the fluidised bed. The motion may, for example, be linear, rotary and/or oscillatory. The substrate may, additionally, be shaken or subjected to vibration in order to remove particles adhering only loosely to it. As an alternative to a single immersion, the substrate may be repeatedly immersed and withdrawn until the desired total period of immersion has been achieved.

The pressure of the fluidising gas will depend on the bulk of the powder to be fluidised, the fluidity of the powder, the dimensions of the fluidised bed, and the pressure difference across the porous membrane, and will generally be in the range of from 0.1 to 10.0 bar. Possible ranges include 0.5 to 4.0 bar and in certain circumstances 2.0 to 4.0 bar would be suitable.

The thickness of the applied coating may be in the range of from 5 to 200 microns or 5 to 100 microns, more especially from 10 to 150 microns, possibly from 20 to 100 microns, 60 to 80 microns or 80 to 100 microns or 50 to 150 microns, advantageously 50 microns or less, and preferably from 15 to 40 microns. The principal factors affecting the thickness of the coating are particle size distribution and the applied charge, but the duration of the period of immersion in charged condition and the proximity, size and shape of any counter electrodes also have an influence.

The quantity of the powder coating composition deposited on the substrate or a series of substrates is relatively very small as compared with the quantity of the composition in the fluidised bed. Some replenishment may, however, be desirable from time to time.

When the substrate is a metal or other conductive material, the substrate is advantageously chemically or mechanically cleaned prior to application of the powder coating material, and is preferably subjected to chemical pre-treatment, for example with iron phosphate, zinc phosphate or chromate.

Substrates other than metallic substrates are in general preheated prior to application or are pre-treated with a material that will aid such application.

Further details of, and apparatus suitable for use in the processes described above are described in WO 99/30838, WO 02/98577, WO 2004052557 and WO 2004052558, the contents of which are incorporated herein by reference.

The powder material used in the process according to the invention comprises at least one solid film-forming resin and includes any curing agent required therefor. Usually the powder material is coloured, and the colouring agent or agents (pigments and/or dyes), plus any curing agent, is extruded with the film-forming resin(s) so that particles formed therefrom generally comprise film-forming resin, colouring agent and, where applicable, curing agent.

The powder coating material may contain a single film-forming resin or may comprise a mixture of two or more such resins.

The film-forming resin (polymer) acts as a binder, having the capability of wetting pigments and providing cohesive strength between pigment particles and of wetting or binding to the substrate, and melts and flows in the curing/stoving process after application to the substrate to form a homogeneous film.

The film-forming component or each film-forming component of the powder coating material will in general be a thermosetting system, although thermoplastic systems (based, for example, on polyamides) can in principle be used instead. Any powder coating chemistry may be used.

When a thermosetting resin is used, the solid polymeric binder system generally includes a solid curing agent for the thermosetting resin; alternatively two co-reactive film-forming thermosetting resins may be used.

The film-forming polymer used in the manufacture of a film-forming component of the thermosetting powder coating material may be one or more selected from carboxy-functional polyester resins, hydroxy-functional polyester resins, epoxy resins, and functional acrylic resins.

A film-forming component of the powder coating material can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10-100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehye resin, or a glycol ural formaldehye resin, for example the material "Powderlink 1174" supplied by the Cyanamid Company, or hexahydroxymethyl melamine. A blocked isocyanate curing agent for a hydroxy-functional polyester may, for example, be internally blocked, such as the uretdione type, or may be of the caprolactam-blocked type, for example isopherone diisocyanate.

As a further possibility, an epoxy resin can be used, with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin, can be used with an appropriate curing agent.

Mixtures of film-forming polymers can be used; for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

The film-forming resin, including any crosslinker or curing agent therefore is generally present in the powder coating composition of the invention in an amount of at least 50 wt. %, more specifically at least 60%, still more specifically at least 65 wt. %. It is generally present in an amount of at most 95 wt. %, more specifically at most 85 wt. %. All this is calculated on the weight of the powder coating composition without post-blended additives.

The powder coating composition may or may not contain a pigment, as is known in the art. If a pigment is used it is generally present in an amount of 0.1-40 wt. %, more specifically, 5-35 wt. %. The exact amount of pigment will depend on the specific circumstances, including the colour of the pigment. Usually a pigment content of 20 to 35 wt. % is used, although in the case of dark colours opacity can be obtained with 0.1-10% by weight of pigment. All this is calculated on the weight of the powder coating composition without post-blended additives.

Examples of pigments which may be used are inorganic pigments, such as, for example, titanium dioxide white, red and yellow iron oxides, chrome pigments and carbon black, and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes may be used instead of or as well as pigments. A coloured coating material may contain a single colorant (pigment or dye) or may contain more than one colorant; alternatively, the coating material may be free from added colouring agents.

The powder coating material may also include one or more extenders or fillers, which may be used inter alia to assist opacity, whilst minimising costs, or more generally as a diluent. The following ranges should be mentioned for the total pigment/filler/extender content of the film-forming polymeric material: 0% to 55% by weight, 0% to 50% by weight, 10% to 50% by weight, 0% to 45% by weight, and 25% to 45% by weight. Of the total pigment/filler/extender content, a pigment content of ≦40% by weight of the film-forming polymeric material may be used. Usually a pigment content of 25-30% or 35% is used, although in the case of dark colours opacity can be obtained with <10% by weight of pigment. Usually, these colouring agents and performance additives will be incorporated into the film-forming material before and/or during the extrusion or other homogenisation process, and not by post blending.

The function of coatings is of course protective, but appearance is also important, and the film-forming resin and other ingredients are selected so as to provide the desired performance and appearance characteristics. In relation to performance, coatings should generally be durable and exhibit good weatherability, stain or dirt resistance, chemical or solvent resistance and/or corrosion resistance, as well as good mechanical properties, e.g. hardness, flexibility or resistance to mechanical impact; the precise characteristics required will depend on the intended use. The material must, of course, be capable of forming a coherent film on the substrate, and good flow and levelling of the material on the substrate are required. Accordingly, the powder coating material generally also contains one or more performance additives such as, for example, a flow-promoting agent, a plasticiser, a stabiliser, for example a stabiliser against UV degradation, or an anti-gassing agent, such as benzoin. Such additives are known additives for use in powder coating materials, incorporated with film-forming polymer before and/or during the extrusion or other homogenisation process.

If performance additives are used, they are generally applied in a total amount of at most 5 wt. %, preferably at most 3 wt. %, more specifically at most 2 wt. %. If they are applied, they are generally applied in an amount of at least 0.1 wt. %, more specifically at least 1 wt. %.

After application of the powder coating material to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving) generally for a period of 10 seconds to 40 minutes, at a temperature of 90 to 280° C., until the powder particles melt and flow and a film is formed, usually for a period of from 5 to 30 minutes and usually at a temperature in the range of from 150 to 220° C., although temperatures down to 90° C. may be used for some resins, especially epoxy resins, and temperatures up to 280° C. are also possible. The curing times and temperatures are interdependent in accordance with the composition formulation that is used, and the following typical ranges may be mentioned:

| Temperature/° C. | Time |
| --- | --- |
| 280 to 90 | 10 s to 40 min |
| 250 to 150 | 15 s to 30 min |
| 220 to 160 | 5 min to 20 min |

The following Examples illustrate the invention:—

EXAMPLES

Formulations

The formulations I-VII referred to in the Examples are as shown below.

| Formulation I<br>System: 50:50 polyester-epoxy hybrid | | Formulation II<br>System: polyester | |
| --- | --- | --- | --- |
| Raw Materials | Weight (g) | Raw Materials | Weight (g) |
| Acid-functional polyester resin | 26.30 | Acid-functional polyester resin | 67.61 |
| Epoxy resin curing agent | 26.30 | Glycidyl-functional curing agent | 5.90 |
| Catalyst | 3.00 | (Araldite PT910) | |
| Flow modifier | 1.00 | Accelerator for epoxy-acid | 0.20 |
| Wax | 0.30 | reaction (based on quaternary | |
| Filler (dolomite) | 10.70 | ammonium salt) | |
| Benzoin | 0.30 | Flow modifier | 1.00 |
| Rutile titanium dioxide | 32.10 | Blanc Fix (filler) | 10.00 |
| TOTAL | 100 | Benzoin | 0.30 |
| | | Carbon black pigment | 0.50 |
| | | Indanthrone blue pigment | 0.08 |
| | | Nickel antimony titanium rutile pigment | 1.90 |
| | | Rutile titanium dioxide (white pigment) | 12.51 |
| | | TOTAL | 100 |

| Formulation III<br>System: Polyester - Primid | | Formulation IV<br>System: 60:40 polyester-epoxy hybrid | |
| --- | --- | --- | --- |
| Raw Materials | Weight (g) | Raw Materials | Weight (g) |
| Acid-functional polyester resin | 58.43 | Acid-functional polyester resin | 44.11 |
| Hydroxyalkylamid curing agent (Primid XL 552) | 3.08 | Epoxy resin | 29.40 |
| | | Catalyst | 0.20 |
| Flow modifier | 1.20 | Flow Modifier | 1.00 |
| Amine modified wax | 0.49 | Filler (Dolomite) | 10.00 |

-continued

| | | | |
|---|---|---|---|
| Antioxidant | 0.10 | Benzoin | 0.30 |
| Benzoin | 0.29 | Carbon black pigment | 0.50 |
| Rutile titanium dioxide (white pigment) | 36.40 | Indanthrone blue pigment | 0.08 |
| | | Nickel antimony titanium rutile pigment | 1.90 |
| TOTAL | 100 | Rutile titanium dioxide (white pigment) | 12.51 |
| | | TOTAL | 100 |

| Formulation V<br>System: 50:50 polyester-epoxy hybrid | | Formulation VI<br>System: polyester - Primid | |
|---|---|---|---|
| Raw Materials | Weight (g) | Component | Percentage Composition |
| Acid-functional polyester resin | 22.3 | Polyester resin | 58.10 |
| Epoxy resin | 22.3 | Primid (tetrakis (2-hydroxyethyl) adipamide) | 1.90 |
| Iron oxide black pigment | 0.04 | | |
| Phthalocyanine green pigment | 0.004 | Degassing agent | 0.45 |
| Iron oxide yellow pigment | 0.03 | Wax | 0.3 |
| Benzoin | 0.3 | Catalyst | 0.2 |
| Polyethylene wax | 0.3 | UV Stabiliser | 0.25 |
| Electrostatic charge enhancing additive | 0.3 | Rheology modifier | 1 |
| | | Titanium Dioxide | 32.7 |
| Acid functional polyester/ polyvinyl butyral resin blend | 9.81 | Polyester resin with flow acid | 5.1 |
| | | TOTAL | 100 |
| Filler (barytes) | 7.43 | | |
| Rutile titanium dioxide (white pigment) | 29.74 | | |
| Epoxy resin/flow modifier blend | 7.43 | | |
| TOTAL | 100 | | |

| Formulation VII<br>System: Polyester - epoxy hybrid | |
|---|---|
| Raw Materials | Weight (g) |
| Carboxy-functional polyester Resin | 45.9 |
| Epoxy resin | 30.7 |
| Catalyst | 0.2 |
| Flow additive | 1.2 |
| Degassing agent | 0.4 |
| Filler | 15.9 |
| Carbon black pigment | 0.4 |
| Rutile titanium dioxide (white pigment) | 5.3 |
| | 100 |

Measurement of Fluidisation Characteristics

In the subsequent Examples fluidisation characteristics were measured by the following methods.

Method 1

Measurement of Hausner Ratios

Aerated Density

The sample (a minimum of 150 g of powder) is shaken in a bag. The aerated density equipment is switched on and the sieve shaker turned on to full speed. The sample is poured slowly through the sieve into a density cup on a tray, until the cup is full to excess. The sieve shaker is turned off, excess powder is scraped off the cup with a flat edge, and the density cup is weighed. Powder is returned to the bag and the process repeated. An average of the 2 values is taken.

Tap Density

The density cup and extender cup are lubricated with wax, the extender cup is slotted onto the density cup and screwed onto the lever arm on the Tap density equipment. The powder sample is poured into the cup to the brim to ensure no gaps when the powder is packed down by a tapping motion. The equipment is turned on, the cup being tapped 180 times automatically. Excess powder is removed, the excess powder scraped off and the cup weighed as above. An average of two values is taken.

Measurements were taken using the Hosokawa powder tester as detailed in Powder Testing Guide by Svarovsky (Kuwer Academic Publisher, October 1987).

The Hausner ratio: tapped density: aerated density

The Hausner ratio was determined for the powders as produced and also blends with additives consisting of a mixture of aluminium hydroxide and aluminium oxide in the ratio 55:45 by weight ("denoted additive 1").

The aluminium oxide used was Aluminium Oxide C, ex Degussa, mean particle size <0.2 microns; the aluminium hydroxide used was Martinal OL 103C, ex Omya Croxton & Garry, mean particle size 0.8 microns. The additive was blended with the powder using a standard tumbler for at least 20 min.

Method 2
Measurement of Grad Number

A commercial instrument, the FT3, supplied by Freeman-tech Instruments, is used. Initially no fluidising air is used, five conditioning runs being carried out initially to stabilise the powder. A test run with no fluidisation is then carried out. The first level of fluidising air is then set, and two conditioning runs are used to initially fluidise the powder, followed by a test run. The powder is used with an addition of 0.3% of additive 1, calculated on the powder without additive. The two aeration tests differ only in the air flow used:

Test 1—0.25 cc/min
Test 2—0.05 cc/min

The energy measured at zero airflow is compared with the energy measured at a defined airflow. The difference between these two points (the Grad number, for example for an airflow of 0.05, the Grad number at Grad 0.05) is a measure of the ease with which a powder can be fluidised, which is an essential feature for the application of powder paints. Thus, powders with a relatively high Grad number are preferred.

Preparation of Powders of the Invention

Example 1

Powder C6 was prepared from formulation V by extrusion on a PKL 46 BUS extruder at a barrel temperature of 120° C. The extrudate was cooled down and flattened on a cooling cylinder just outside the extruder die and then kibbled to flakes. The chip was micronised in an Alpine ACM5 mill to give a powder with d(v,90) of just under 38 µm. The mill utilises a twin-cyclone collection mechanism and the preparation of powders was carried out by the standard operating procedure whereby the fine fraction from the second cyclone is discarded, the product collected being the product from the base of Cyclone I.

The powder was then bonded to give powder B6.2 using a Hosakawa CycloMix apparatus operating at 350 rpm (the speed being held constant throughout the process until cooling is begun) with a load weight of 25 kg (the "load weight"—the weight of material to be bonded—being the weight of material load in the pan of the mixer unit. The weight used depends very much on the particle size distribution of the powder to be bonded. There is a difference in bulk density of the powder because smaller particles entrain more air, but the load in each case is chosen normally to keep the free space within the equipment to a minimum to maximise particle-particle interaction for the generation of heat. (In the Cyclo mixer, the load can vary from 20 to 25 kg, with the lower limit being for very fine powder and the upper limit for very coarse powder, and with the upper figure applying in this case.) Bonding was carried out with the temperature of the thermal fluid circulating in the jacket of the mixer (referred to elsewhere as "the temperature of the mixer") set to Tg+7° C.) where Tg is the glass transition temperature of the resin system used. The rate of heating was no more than 2° C. per min for at least the last 5° up to the maximum, after which the powder was cooled immediately, the maximum temperature of the powder itself being Tg+8° C., and the overall time for the process before cooling is begun being 20 mins. The powder was sifted through a screen with a mesh of 120 µm.

Details of the particle size distribution in volume and surface area terms of powders C6 and B6.2 are summarised below. Particle size data was obtained using the Mastersizer X laser light-scattering device from Malvern Instruments, refractive index 1.45, absorption index 0.1.

TABLE 1

| Powder | Volume | | | | Surface | | |
|---|---|---|---|---|---|---|---|
| | % < 5 µm | % < 10 µm | d(v, 90) | d(v, 99) | d(s, 10) | d(s, 90) | sq val |
| C6 (comparative) | 4.7 | 16.8% | 37.8 µm | 54.2 µm | 0.6 µm | 27.9 µm | 103.4 |
| B6.2 | 1.3 | 3.8% | 40.4 µm | 55.5 µm | 6.5 µm | 34.7 µm | 1.03 | sq val = $[d(s, 90)/d(s, 10]^2 + (d(v, 90) - 7)]$

Powder B6.2 has a sub-10 µm fraction less than 12% and d(v,90) less than 42.5 µm and complies with the requirement $[d(s,90)/d(s,10]2 \div [(d(v,90)-7)] \leq 3.5$, and can be classified as a powder of the invention. In contrast, powder C6, although having an appropriate d(v,90), does not have the specified sub-10 µm fraction and nor does it comply with the alternative relationship specified using surface area values, and so does not fall within the present invention.

Example 2

Example to Demonstrate the Design and Preparation of Optimised Powder for Fluidised Bed Application Powder C6 prepared as described in Example 1 was used for fluidised bed coating on a series of 7×7 cm aluminium panels in accordance with the method of WO 99/30838, with particular reference to FIG. 1 of that specification. Portions of the test powder post-blended with 0.6% by weight of a mixture of aluminium oxide and aluminium hydroxide (additive 1) deposited into an earthed fluid bed and a fluidising pressure of 1.2 bar was applied. The fludising bed used was the Nordson Mini-hopper fluid bed, 25 cm height and 15 cm diameter. The bed was allowed to stabilise for 15 mins before the test. Throughout the tests, small amounts of stock powder (approximately 2 g) were added to the fluid bed after each panel was coated to maintain a constant fluid height. During coating, the voltage applied to the substrate was +2 kV, and the dip time was 1 min. A total of 40 panels were coated.

Once coated, the powder deposited on each panel before cure was weighed and the particle size distribution was measured. Small samples of powder were also taken from the fluid bed during the course of the tests at the start, middle and end of the test (panels 1, 21 and 40) and an average was taken. Particle size distributions were measured on the Mastersizer X as in Example 1.

Table 2 below shows the results obtained for an average of the first 40 panels.

TABLE 2

| Powder C6 + additive | Sub-10 µm content | d (v, 90) | D (v, 99) |
|---|---|---|---|
| Bulk powder in bed | 16.8% | 38 µm | 55 µm |
| Powder deposited av 40 panels | 26.0% | 26 µm | 38 µm |
| Difference relative to deposited powder | −9.2%** | +46% | |

(**difference is difference in absolute figures)

Comparison of the powder deposited and the powder in the fluidised bed showed that the sub-10 µm content in the deposited powder was 9.4% more (as an absolute figure) than in the fluidised bed used, and the maximum particle size deposited (as measured by d(v,99) and d(v,90)) was lower; the d(v,90) figure differing by approximately 46%, calculated on the powder deposited. These powders are not "matching" powders.

A further powder with a d(v,99) closer to that of the deposited powder was prepared from the C6 powder chip by milling using the Alpine ACM5 mill as described in Example 1 above to give powder C20 with particle size features measured by the Mastersizer X as shown in Table 3 below. The d(v,99) was within 6.5% of the d(v,99) of the powder deposited above.

TABLE 3

| Powder | % sub-5 μm | % sub-10 μm | D (v, 90) | D (v, 99) |
|---|---|---|---|---|
| C20 | 7.5 | 24.7% | 28.8 μm | 40.4 μm |

The above sequence of deposit, removal, particle size measurement and comparison was repeated. The result is shown in Table 4 below.

TABLE 4

| Powder C20 + additive | Sub-10 μm content | d (v, 90) | d (v, 99) |
|---|---|---|---|
| Bulk powder in bed | 25.1% | 29 μm | 41 μm |
| Powder deposited av 40 panels | 22.8% | 23 μM | 32 μM |
| Difference relative to deposited powder | +2.3%** | +26% | |

(**difference is difference in absolute figures)

Comparison of the figures still showed a difference (2.3%) in the sub-10 μm content of the powder deposited and the powder used in the fluidised bed, and in the d(v,90) figures (26%, calculated on the powder deposited). These are non-matching powders; but the differences were less than for powder C6.

Accordingly, a further powder was prepared from powder C20 by the bonding method as described in Example 1 above to give a powder that "matched" its deposited powder when the sequence of deposition, collection, removal and comparison steps was repeated, bonding being carried out on the CycloMix operating at 350 rpm with a load weight of 20 kg, a heater temperature of Tg+6° C., a rate of heating of no more than 2° C. per min above about 45 to 50° C., to a maximum temperature of Tg+8.5° C. followed by cooling, the total time for the heat-up being 20 mins (without cooling; total bonding time including cool-back 25 mins), followed by passing through a screen of mesh size 120 μm.

Particle size details in terms of volume and surface area for the resulting successful powder B20 are summarised in Table 5 below, together with those for the comparison powder C20, and deposition details for the successful powder are given in table 6 below. Measurement was by Mastersizer X as in Example 1. The powder had d(v,90)≦40 μm and a sub-10 μm fraction ≦12%.

TABLE 5

| Powder | Volume | | | | Surface | | |
|---|---|---|---|---|---|---|---|
| | % < 5 μm | % < 10 μm | d(v, 90) | d(v, 99) | D(s, 10) | d(s, 90) | sq val |
| C20 (comparative) | 7.5 | 24.7% | 28.8 μm | 40.4 μm | 0.6 μm | 21.7 μm | 89.0 |
| B20 | 2.2 | 7.7% | 34.1 μm | 46.8 μm | 4.6 μm | 29.1 μm | 1.81 |

TABLE 6

| Powder B20 + additive | Sub-10 μm content | d (v, 90) | d (v, 99) |
|---|---|---|---|
| Bulk powder in bed | 8.6% | 36 μm | 49 μm |
| Powder deposited av 40 panels | 8.2% | 35 μm | 47 μm |
| Difference relative to deposited powder | +0.4%** | 2.9% | |

(**difference is difference in absolute figures)

These are "matching" powders, and B20 falls within the preferred sub-class of powders of the invention. A comparison of its powder deposition with that of other powders is given in Example 8 below.

Example 3

The following Example describes the preparation of further powders by the bonding process, and illustrates how bonding conditions influence the particle size distribution of the powder produced. Bonding to form a powder of the invention should be carried out such that d(v,90)≦42.5 μm and the sub-10 μm content is ≦12%, and/or such that $[d(s,90)\div d(s,10)]^2 \div [d(s,90)-7] \leq 3.5$ and d(v,90)≦42.5 μm.

Further powder coating materials C1-C5, C8, C9, C11, C14, C16, C18 and C19 were prepared using the extrusion process as in Example 1 above and by micronising using the Alpine ACM5 mill under standard operating conditions as above whereby the product collected is the product from the base of cyclone 1 (identified as Cycl I in the subsequent Table), or by making efforts to collect the entire product from the mill, the operation of the mill's twin-cyclone collection system then being described as "total collect" mode (identified as "Total Col" in the Table). (In total collect mode the product from the base of both cyclones was collected, the airflow through the milling and collection system being adjusted to minimise product losses to the after-filter system; in reality, however, a twin-cyclone system necessarily allows some ultra-fines to pass out of the second cyclone to the after-filter system, so that it is not really a true "total collect" system). The top-end classification was carried out by fixing the speed of the wheel classifier in the mill. Table 7 shows details of the formulation, collection mode and particle size as measured by the Malvern Mastersizer X as above for these powders and for powder C6 from Example 1, all powders being used subsequently below.

TABLE 7

| Starting Powder | Formulation | Collection | % < 10 μm | D (v, 90) |
|---|---|---|---|---|
| C1 | I | Total Col | 14.5% | 49.2 μm |
| C2 | I | Total Col | 20.9% | 41.5 μm |
| C3 | I | Total Col | 14.8% | 46.0 μm |
| C4 | I | Total Col | 15.0% | 52.0 μm |
| C5 | I | Total Col | 14.7% | 53.7 μm |
| C6 | V | Cycl 1 | 16.8% | 37.8 μm |
| C8 | I | Total Col | 18.2% | 40.1 μm |

TABLE 7-continued

| Starting Powder | Formulation | Collection | % < 10 μm | D (v, 90) |
|---|---|---|---|---|
| C9 | I | Total Col | 21.0% | 34.6 μm |
| C10 | II | Total Col | 15.4% | 43.9 μm |
| C11 | II | Cycl I | 18.8% | 41.9 μm |
| C14 | IV | Total Col | 22.7% | 27.3 μm |
| C16 | II | Total Col | 22.7% | 28.6 μm |
| C18 | III | Total Col | 18.2% | 37.3 μm |
| C19 | III | Total Col | 15.3% | 37.5 μm |

The powders were then loaded into a Henschel, Mixaco CM3, CycloMix or Mixaco CM1000 mixer and bonded to produce agglomerated powders, starting powders C3, C8, C16 and C19 each being bonded under different agglomeration conditions to give, respectively, powders B3.1 and B3.2; B8.1, B8.2 and B8.3; B16.1 and B16.2; and B19.1 and B19.2. For each bonded powder the mixer used (with blade speed), the weight of the material loaded in the mixer, the heater temperature and the maximum temperature reached in the mixer, as well as the total heating time before cooling, are recorded in the Table 8 below.

TABLE 8

| Powder | Starting Powder | Bonding | Mixer | Temp heater | Load, wt (kg) |
|---|---|---|---|---|---|
| B1 | C1 | Tg + 8° C. @ 16 min | Henschel[1] | Tg + 1° C. | 11.5 |
| B2 | C2 | Tg + 5° C. @ 10 min | Mixaco CM3[2] | Tg + 3° C. | 2 |
| B3.1 | C3 | Tg + 14° C. @ 15 min | Mixaco CM3[2] | Tg + 5° C. | 2 |
| B3.2 | C3 | Tg + 7° C. @ 12 min | Mixaco CM3[3] | Tg + 3° C. | 2 |
| B4 | C4 | Tg + 8° C. @ 16 min | Henschel[1] | Tg | 13 |
| B5.1 | C5 | Tg + 8° C. @ 8 min | Mixaco CM3[2] | Tg + 3° C. | 2 |
| B5.2 | C5 | Tg + 8° C. @ 10 min | Mixaco CM3[2] | Tg + 3° C. | 1.5 |
| B6.1 | C6 | Tg + 7° C. @ 20 min | CycloMix[7] | Tg + 6° C. | 25 |
| B8.1 | C8 | Tg + 5° C. @ 45 min | Mixaco CM1000[4] | 45° C. | 271-310 |
| B8.2 | C8 | Tg + 5° C. @ 55 min | Mixaco CM1000[4] | 45° C. | 271-310 |
| B8.3 | C8 | Tg + 5° C. @ 60 min | Mixaco CM1000[4] | 45° C. | 271-310 |
| B9 | C9 | Tg + 9° C. @ 12 min | Mixaco CM3[2] | Tg + 5° C. | 2 |
| B10 | C10 | Tg + 9° C. @ 13 min | Mixaco CM3[2] | Tg + 6° C. | 2 |
| B11 | C11 | Tg + 8° C. @ 20 min | Mixaco CM3[2] | Tg + 3° C. | 2 |
| B14 | C14 | Tg + 7° C. @ 17 min | Mixaco CM3[2] | Tg + 5° C. | 2 |
| B16.1 | C16 | Tg + 7° C. @ 15 min | Mixaco CM3[2] | Tg + 5° C. | 2 |
| B16.2 | C16 | Tg + 8° C. @ 22 min | Mixaco CM3[2] | Tg + 5° C. | 2 |
| B18 | C18 | Tg + 5° C. @ 10 min | Mixaco CM3[2] | Tg + 3° C. | 2 |
| B19.1 | C19 | Tg + 5° C. @ 17 min | Henschel[5] | Tg | 16 |
| B19.2 | C19 | Tg + 2° C. @ 12 min | Henschel[6] | Tg | 16 |

[1]operated at 1000-500 rpm
[2]operated at 8/10 speed setting
[3]operated at 10/10 speed setting
[4]operated at Program A (see below)
[5]operated at 1000-750 rpm
[6]operated at 1000-300 rpm
[7]operated at 350 rpm In the Table the heater temperature ("Temp heater") is the temperature at which the thermal fluid circulating in the jacket of the mixer unit is set at the start of the bonding process. For the Mixaco CM1000 mixer that temperature is set at 45° C. and afterwards dropped according to the programme used. For other mixers the fluid jacket temperature is constant until cooling begins.

In the Henschel mixer the speed is manually adjusted during the process, routinely being started at 1000 rpm blade speed, then reduced until the desired maximum temperature of the powder is reached (normally at 600-650 rpm), and then reduced further to the lower figure quoted in the footnote where it is held for 1 minute and the cooling then started. The Henschel mixer can vary from 10 to 20 kg, with the lower limit for very fine powder and the upper limit very coarse powder.

In the Mixaco CM1000 mixer unit, the speed is adjusted throughout the process automatically by a PLC executed program. The program A used comprises the following actions in sequence: (a) speed 1200 rpm until the powder temperature reaches 45° C.; (b) speed 1100 rpm to bring the powder the desired maximum temperature; (c) speed 200 rpm during cooling until the powder reaches 35° C. The load can vary from 215 to 320 kg, with the lower limit for very fine powder and the upper limit for very coarse powder.

The rate of heating in each case was no more than 4° C. per min at temperatures above 45° C. On reaching the maximum temperature, the powder was cooled immediately.

The bonded powders were then sifted through a screen with a mesh of 120 μm.

Particle Size Measurements

Particle size measurements for the powders, and for certain commercially available powders C21: Commercial powder from Dong Yu
C22: Interpon FA 515M from Akzo Nobel Powder Coatings
C23: Interpon FA 923E from Akzo Nobel Powder Coatings
C24: Interpon FA 916M from Akzo Nobel Powder Coatings, were taken using the Malvern Mastersizer X as in Example 1 above, and the results are given in Table 9 below.

TABLE 9

| Powder | % < 10 μm | D (v, 90) |
|---|---|---|
| C1 (comparative) | 14.5% | 49.2 μm |
| B1 (comparative) | 4.6% | 49.7 μm |
| C2 (comparative) | 20.9% | 41.5 μm |
| B2 (comparative) | 8.4% | 45.5 μm |
| C3 (comparative) | 14.8% | 46.0 μm |
| B3.1 (comparative) | 9.1% | 48.3 μm |
| B3.2 (comparative) | 13.9% | 46.5 μm |
| C4 (comparative) | 15.0% | 52.0 μm |
| B4 (comparative) | 4.8% | 58.4 μm |

TABLE 9-continued

| Powder | % < 10 μm | D (v, 90) |
|---|---|---|
| C5 (comparative) | 14.7% | 53.7 μm |
| B5.1 (comparative) | 7.4% | 54.8 μm |
| B5.2 (comparative) | 10.2% | 54.2 μm |
| C6 (comparative) | 16.8% | 37.8 μm |
| B6.1 | 8.0% | 38.8 μm |
| C8 (comparative) | 18.2% | 40.1 μm |
| B8.1 (comparative) | 15.0% | 40.2 μm |
| B8.2 | 10.9% | 40.4 μm |
| B8.3 | 9.3% | 40.7 μm |
| C9 (comparative) | 21.0% | 34.6 μm |
| B9 | 5.6% | 40.6 μm |
| C10 (comparative) | 15.4% | 43.9 μm |
| B10 (comparative) | 11.9% | 44.1 μm |
| C11 (comparative) | 15.8% | 41.9 μm |
| B11 | 8.4% | 42.3 μm |
| C14 (comparative) | 22.7% | 27.5 μm |
| B14 (comparative) | 21.0% | 27.5 μm |
| C16 (comparative) | 22.7% | 28.6 μm |
| B16.1 (comparative) | 20.9% | 28.9 μm |
| B16.2 (comparative) | 18.5% | 29.0 μm |
| C18 (comparative | 15.2% | 37.3 μm |
| B18 | 11.4% | 38.7 μm |
| C19 (comparative) | 15.3% | 37.5 μm |
| B19.1 (comparative) | fused* | fused* |
| B19.2 | 10.4% | 38.7 μm |
| C21 (comparative) | 20.8% | 56.9 μm |
| C22 (comparative) | 9.6% | 55.6 μm |
| C23 (comparative) | 15.2% | 39.1 μm |
| C24 (comparative) | 19.0% | 39.8 μm |

*Not measurable: powder totally fused.

Powders B6.1, B8.2, B8.3, B9, B11, B18 and B19.2 all have d(v,90) less than 42.5 μm and a sub-10 μm fraction less than 12%, and so fall within the invention. Powders B6.1, B18 and B19 all have d(v,90) less than 40 μm and so fall within the preferred sub-class of powders of the invention.

Some unbonded powders have too high a d(v,90) and further milling and bonding is required. C10, for example, has too high a d(v,90) and on bonding a further increase is found. However, when milled to the particle size of C11 and some classification carried out (C11 is a "cycl 1" powder, rather than "total" collect) and bonded under different conditions, a powder of the invention B11 is formed; it should be noted here that bonding temperature was lower than for powder B10 but bonding time is increased from 13 to 20 mins. Simple trial runs will allow suitable bonding conditions to be established.

Some powders have too high a sub-10 μm fraction, and bonding or further bonding of the powder may be carried out. In the case of unbonded powder C2, for example, the powder has an acceptable d(v,90) but too high a sub-10 μm content. Bonding led to powder B2 with a d(v,90) above 42.5 μm, but an acceptable sub-10 μm fraction. Further milling of the starting powder followed by bonding (compare powder B9 prepared from C9), or bonding of the same powder under different conditions can be carried out (compare powder B11 of the invention prepared from a powder of comparable particle size). In the case of bonded powders B8.1, B14, B16.1 and B16.2, the d(v,90) is acceptable but the sub-10 μm content is too high, and further bonding may be tried, or re-bonding of the starting powder should be tried under different conditions. As can be seen, re-bonding of powder C8 for a longer time than used to powder B8.1 gave powders B8.2 and B8.3 within the invention with bonding of powder C16 at different temperatures and for two different bonding times, the resulting powders both had too high a sub-10 μm fraction, but the results are included to demonstrate that increased bonding temperature and time bring about a further reduction in the sub-10 μm content without in this case substantially affecting d(v,90). With powder C14, also, bonding under the conditions shown resulted in virtually no increase in d(v,90), but re-bonding for a longer time and/or at higher temperature can be tried.

It should also be noted that bonding of powder C19 under the conditions shown for powder B19.2 (Henschel mixer, 100-300 rpm, load 16 kg, heater temperature Tg, bonding for 12 mins at Tg+2° C.) gave a powder of the invention having d(v,90)≦42.5 μm and a sub-10 μm fraction ≦12%, and complying with the relationship $[d(s,90) \div d(s,10)]^2 \div [d(s,90)-7]$ ≦3.5, but when the bonding was carried out for 17 mins at Tg+5° C. and at blade speed 1000-750 rpm, the product produced (powder B19.1) was totally fused.

Example 4

An air-classified powder P was prepared from formulation VII by standard extrusion, followed by grinding and classification to remove fines using a Neuman & Esser 48/60-378/630 microniser/CSAR 70 classifier to give a powder with the particle size distribution shown in Table 10 below. Particle sizes were measured using the Mastersizer 2000 instrument (refractive index 1.45, absorption index 0.01).

TABLE 10

| | Volume | | | | |
|---|---|---|---|---|---|
| Powder | % < 5 μm | % < 10 μm | D(v, 50) | d(v, 90) | d(v, 99) |
| P | 3.4% | 11.8% | 19 μm | 33 μm | 50 μm |

Example 5

Three unbonded powder formulations (not according to the invention) were prepared from the base formulation VI by extruding as in Example 1 and milling under the conditions given Table 11 below.

TABLE 11

| Powder | Mill employed | Mill settings | Sieve size | Dv (99) |
|---|---|---|---|---|
| D1 | Hosakawa ACG Jetmill[1] | Speed 10000 rpm | N/A | 15.8 μm |
| E1 | Hosakawa ACG Jetmill[1] | Speed 4350 rpm | 44 μm | 44.8 μm |
| G1 | Hosakawa ACM Mill 40 | Rotor 5600 rpm Classifier 1500 rpm | 106 μm | 90.1 μm |

[1]All powders manufactured by the Jetmill had to be premilled to a coarse powder before milling.

Particle size details (by volume) of the resulting powders were measured by Mastersizer 2000 and are given in Table 11 below.

TABLE 12

| Powder | % < 5 μm | % < 10 μm | D(v, 90) (μm) |
|---|---|---|---|
| D1 | 33.5 | 83.2 | 11.5 |
| E1 | 5.9 | 21.5 | 33.2 |
| G1 | 2.8 | 8.4 | 65.8 |

Each unbonded powder was then used as starting material to prepare bonded powders according to the invention using a Mixaco CM3 mixer in which the temperature of the mixer was set to Tg+4° C. and the blade speed was set to the eighth level (out of ten), the speeds being on an analogue scale with zero indicating still blade and 10 indicating the maximum speed. The speed is set at the start of the process but altered to ensure the chosen heating rate is obtained until the maximum temperature is reached and then altered to hold at the maximum temperature until cooling is started. Other process conditions, selected to produce powders having the desired particle size distribution according to the invention, are given in Table 13 below. The load weight used depends very much on the particle size distribution of the powder to be bonded; in the Mixaco CM3 mixer the standard procedure is to use about 2 kg, but a lower load is used for the smaller powder D1. The rate of heating in each case was no more than 2° C. per min over at least the last 5° C. The temperature was held at the maximum for 2 mins before cooling.

TABLE 13

| Powder | Starting powder | Max temp and time at that temp | Load wt |
|---|---|---|---|
| D2 | D1 | Tg + 6° C.@2 mins | 1.5 kg |
| D3 | D1 | Tg + 8° C.@2 mins | 1.5 kg |
| E2 | E1 | Tg + 6° C.@2 mins | 2.0 kg |
| E3 | E1 | Tg + 8° C.@2 mins | 2.0 kg |
| G2 | G1 | Tg + 6° C.@2 mins | 2.5 kg |

Following bonding, the powders were sifted through a screen with a mesh of 120 μm and the particle sizes were measured on a Malvern Mastersizer 2000 laser scattering device, refractive index 1.45, absorption index 0.01. Various parameters defining the particle size distribution of the powders by volume and by surface area are given respectively in Tables 14 and 15 below.

TABLE 14

| Powder | % < 5 μm | % < 10 μm | D(v, 90) (μm) |
|---|---|---|---|
| D2 | 15.6 | 78.9 | 11.8 |
| D3 | 3.8 | 46.2 | 17.5 |
| E2 | 2.3 | 12.4 | 40.1 |
| E3 | 1.7 | 7.7 | 40.5 |
| G2 | 1.3 | 7.0 | 68.3 |

TABLE 15

| Powder | D(s, 90) | D(s, 10) | $[d(s, 90) \div d(s, 10)]^2$ | $[d(s, 90) \div d(s, 10)]^2 \div [d(s, 90) - 7]$ |
|---|---|---|---|---|
| D1 | 7.7 | 3.1 | 6.17 | 8.81 |
| E1 | 24.3 | 2.5 | 90.48 | 5.46 |
| G1 | 46.3 | 3.7 | 156.59 | 3.98 |
| D2 | 10 | 4.4 | 5.17 | 1.72 |
| D3 | 14.9 | 5.2 | 8.21 | 1.04 |
| E2 | 29.3 | 4.8 | 26 | 1.67 |
| E3 | 31.7 | 4.3 | 54.35 | 2.20 |
| G2 | 53.4 | 5.1 | 109.63 | 2.36 |

FIG. 1 shows a graph which plots the value of $[d(s,90) \div ds10]^2$ against $d(s,90)$ for each powder. The gradient of the solid line shown in the graph is 3.5 and intersects the $d(s,90)$ axis at $d(s,90)=7$ μm, meaning that all points below the line comply with the relationship $[d(s,90) \div d(s,10)]^2 \div [d(s,90)-7]$, while all points above the line do not comply.

Of the powders complying with the relationship above, E2 and E3 have $d(v,90) \leq 42.5$ μm, and accordingly are powders of the invention. Powders D1, E1, G1 and G2 all fall outside the invention.

Properties of Powders of the Invention

Example 6

Fluidisation Characteristics a) Test of Various Powders of Examples 1 to 4

Fluidisation characteristics of various powders of Examples 1-4 of the invention were assessed by Method 1 given above by measuring the Hausner ratio of the powders produced and of the powders containing a specified proportion of specified additive, percentages being based on the weight of powder without additive. The results are shown in Table 16 below.

TABLE 16

| | Fluidisation Characteristics | | | |
|---|---|---|---|---|
| | Without additive | With additive | | |
| Powder | Hausner Ratio | Type | % | Hausner Ratio |
| C6 (comparative) | 1.44-cohesive | 1 | 0.6 | 1.40-cohesive |
| B6.1 | 1.35 | 1 | 0.75 | 1.22 |
| B6.2 | 1.30 | 1 | 0.6 | 1.20 |
| C8 (comparative) | 1.45-cohesive | — | — | — |
| B8.1 (comparative) | 1.43-cohesive | 1 | 0.75 | 1.35 |
| B8.2 | 1.35 | 1 | 0.4 | 1.26 |
| B8.3 | 1.34 | 1 | 0.75 | 1.24 |
| C9 (comparative) | 1.44-cohesive | — | — | — |
| B9 | 1.32 | 1 | 0.75 | 1.23 |
| C11 (comparative) | 1.44-cohesive | 1 | — | — |
| B11 | 1.32 | | 0.75 | 1.23 |
| C18 (comparative) | 1.45-cohesive | 1 | — | — |
| B18 | 1.37 | | 0.75 | 1.37 |
| C20 (comparative) | 1.68-cohesive | 1 | 0.6 | 1.46-cohesive |
| B20 | 1.66-cohesive | 1 | 0.6 | 1.18 |
| P | — | 1 | 0.6 | 1.21 |

Except where indicated as "cohesive", the Hausner ratio shows that the powder should be classified as non-cohesive.

As can be seen from comparison of each of the pairs of powders, the bonded powders have lower Hausner ratios than the starting powders of comparable d(v,90). Powders of the present invention B6.1 and B6.2, for example, show a substantial reduction in Hausner ratio in comparison with comparative powder C6 and are non-cohesive with and without additive, the bonding conditions for powder B6.2 bringing about a greater degree of bonding of the sub-10 μm fraction than for powder B6.1 (a higher temperature is used—see Examples 1 and 3), and this is reflected in its better Hausner ratios. Powder B20 of the present invention has a lower Hausner ratio than comparable powder C20, but is classified as cohesive, cohesivity arising from the absolute proportion of fine particles which is higher than for B6.2. However, with 0.6% additive, the Hausner ratio is reduced substantially and the powder becomes non-cohesive, in contrast to powder C20.

The Hausner ratios for the powders C1 to C24 available commercially are shown in Table 17. The Hausner ratios of powders C23 and C24 are higher than those of powders B6.1, B6.2, and B18 of the present invention of comparable d(v,90), and the powders are more cohesive than those powders of the invention.

TABLE 17

| Comparison powder | D(v, 90) | Hausner ratio |
|---|---|---|
| C21 | 56.9 | 1.48-cohesive |
| C22 | 55.6 | 1.35 |
| C23 | 39.1 | 1.41-cohesive |
| C24 | 39.8 | 1.44-cohesive | b) Test of Powders of Example 5

The fluidity, or ease of aeration, of the powders of the invention of Example 5 and of the comparative powders of comparable d(v,90) was measured using Method 2 given above. The results are shown in Table 18, which also includes the value of $([d(s,90) \div ds10]^2 \div [d(s,90)-7]$ for each powder.

The Grad 0.05 and Grad 0.25 numbers for each powder according to the invention are at a satisfactorily high level, and it can be clearly seen that, for each powder, the Grad 0.05 and Grad 0.25 numbers are higher than the numbers for the corresponding powder not according to the invention.

TABLE 18

| Powder | Test 2 Grad 0.05 | Test 1 Grad 0.25 | $[d(s, 90) \div d(s, 10)]^2 \div [d(s, 90) - 7]$ |
|---|---|---|---|
| D1 (comparative) | 124 | 181 | 8.81 |
| D2 | 173 | 185 | 1.72 |
| D3 | 297 | 348 | 1.04 |
| E1 (comparative) | 214 | 220 | 5.46 |
| E2 | 503 | 543 | 1.67 |
| E3 | 532 | 647 | 2.20 |

Example 7

Penetration Power

Example 7a

Application Method

Powders C6, B6.2, C20 and B20 containing 0.6% of additive 1 mentioned above were applied to an aluminium panel by the fluidised bed process of GB 0113783.5, as particularly described with reference to the drawings.

The operating conditions were as follows:

| Establishment of fluidised bed | |
|---|---|
| Type of fluid-bed used: | Nordson mini-Hopper, cylindrical 25 cm height and 15 cm diameter. |
| Weight of powder loaded in the bed: | 700-800 g |
| Fluidising pressure: | 3 bar |
| Free fluidisation time for equilibrating the bed: | 30 min |

Substrate

The substrate used in the experiments consists of an aluminium panel folded as shown in the FIG. 2 of GB 0113783.5 to give a piece which is generally U-shaped in plan view (so as to define a central recess) and having dimensions as follows:
a=10 cm
b=7.5 cm
c=5 mm Dipping the Substrate The substrate, connected to the earth, was dipped in the fluidised bed and a DC voltage was applied to the fluidised bed just for the period of immersion. Different dip-times and applied voltages were chosen in order to establish the "best operating conditions" (i.e. lowest applied voltage and shortest dip-time) capable of giving complete coverage of the substrate for each powder.

Curing

The substrate was withdrawn from the bed and baked at a cure schedule of 180° C. for 15 min.

Results

Table 19 below shows the best operating conditions for the powders. The results given are the averages of 10 tests per each operating condition investigated.

TABLE 19

| Powder | Applied Voltage, Volts | Dip-time, sec | INcov, % | OUTcov, % |
|---|---|---|---|---|
| C6 | −2000 | 180 | 100 | 100 |
| B6.2 | 160 | 150 | 100 | 100 |
| B6.2 | 500 | 100 | 100 | 100 |
| C20 | −2000 | 150 | 100 | 100 |
| B20 | −2000 | 80 | 100 | 100 |
| B20 | −1500 | 90 | 100 | 100 |
| B20 | −1000 | 150 | 100 | 100 |

INcov is the coverage in the recessed surface (inner face) of the substrate, assessed visually.
OUTcov is the coverage of the outer surface (outer face) of the substrate, assessed visually.

Since in the coating process of a recessed substrate the coverage of the recessed surface is the bottleneck of the process, the best operating conditions can represent a direct measure of the penetration powder in the recessed areas of the process. As the process operating conditions (type of substrate, type of fluid-bed, amount of powder used, fluidising pressure, etc.) are held constant for the powders tested, those "best operating conditions" reflect the relative penetration power of the powders.

Powder B6.2 required a significantly lower applied voltage value and shorter dip-time than powder C6 for complete coverage. That can directly translate to a better penetration powder for powder B6.2 of the invention. Similarly powder B20 required a significantly lower applied voltage and/or shorter dip time than powder C20, leading to improved penetration for the powder B20 of the invention.

Example 7b

Application Method

Coating was carried out according to the process of WO 99/30838 as particularly described with reference to FIG. 1 of that specification.

Penetration for the powders C6, B6.2, C20 and B20 containing 0.6% of additive 1 was assessed using an aluminium tube of length 168 mm and diameter 39 mm. The tube was hinged to allow inspection of the inner surface after coating. In turn, each of the powders was deposited into an earthed fluid bed, and a fluidising pressure of 1.2 bar was applied. A series of tests was carried out where each tube was submerged in the fluidised powder, and a voltage applied. Over the course of the experiment, the voltage applied to the tube was varied, along with the time of submersion in the powder.

For each test, the weight of powder deposited on the inner surface was recorded. The penetration was measured as the maximum distance, either from the top or bottom of the tube, for powder to be deposited in such a quantity as to prevent metal 'show-through'. This distance was then quoted as a percentage of the total length of the tube.

Results

Each test was carried out 2 times and the value of each run and the average values are reported in Table 20 below.

TABLE 20

| Powder | Voltage (kV) | Time (sec) | Pen 1 (%) | Pen 2 (%) | Average Penetr. | Wt 1 (g) | Wt 2 (g) | Average Weight |
|---|---|---|---|---|---|---|---|---|
| C6 | 0.5 | 15 | 2 | 2 | 2 | 0.013 | 0.024 | 0.0185 |
| B6.2 | 0.5 | 15 | 4 | 5 | 4.5 | 0.031 | 0.042 | 0.0365 |
| C6 | 2.5 | 25 | 13 | 12 | 12.5 | 0.137 | 0.121 | 0.129 |
| B6.2 | 2.5 | 25 | 21 | 20 | 20.5 | 0.515 | 0.520 | 0.518 |
| C6 | 1.0 | 57 | 6 | 7 | 6.5 | 0.091 | 0.025 | 0.058 |
| B6.2 | 1.0 | 57 | 18 | 15 | 16.5 | 0.407 | 0.411 | 0.409 |
| C6 | 1.1 | 30 | 6 | 7 | 6.5 | 0.069 | 0.062 | 0.0655 |

TABLE 20-continued

| Powder | Voltage (kV) | Time (sec) | Pen 1 (%) | Pen 2 (%) | Average Penetr. | Wt 1 (g) | Wt 2 (g) | Average Weight |
|---|---|---|---|---|---|---|---|---|
| B6.2 | 1.1 | 30 | 13 | 14 | 13.5 | 0.351 | 0.312 | 0.3315 |
| C20 | 2.5 | 25 | 8 | 10 | 9 | 0.155 | 0.147 | 0.151 |
| B20 | 2.5 | 25 | 21 | 19 | 20 | 0.561 | 0.516 | 0.539 |

Again the powder systems B6.2 and B20 of the invention shows clearly also in this type of test a higher penetration power into the recessed areas than the comparative powder systems C6 and C20.

Example 8

Process Stability a) Tests on Powder C6, B6.2, C20 and B20

Process stability of powders C6, B6.2, C20 and B20 was tested by carrying out the specified fluidised bed process for a series of panels as in Example 2 above. As well as recording particle size data for the powder deposited on each panel using the Mastersizer X instrument, the average weight of the deposit was determined, and data for the powder in the fluidised bed when each panel was being coated were recorded. Results for powder B6.2 are given in Table 21 below and Table 22 summarises the results for all powders from that Table and earlier Tables 2, 4 and 6.

TABLE 21

| Powder B6.2 + additive | Sub-10 μm content | d(v, 90) | D(v, 99) |
|---|---|---|---|
| Bulk powder in bed | 4.2% | 42 μm | 57 μm |
| Powder deposited av 40 panels | 4.5% | 38 μm | 52 μm |
| Difference relative to deposited powder | −0.3%** | +10.5% | |

(**difference is difference in absolute figures)

TABLE 22

| | Powder | sub-10 μm content | D(v, 90) |
|---|---|---|---|
| Difference between powder used and powder deposited relative to deposited Powder | C6 | −9.2%** | +46% |
| | B6.2 | −0.3%** | +10.5% |
| | C20 | +2.3%** | +26% |
| | B20 | +0.4%** | +2.9% |

(**difference is difference in absolute figures)

Figure 3:
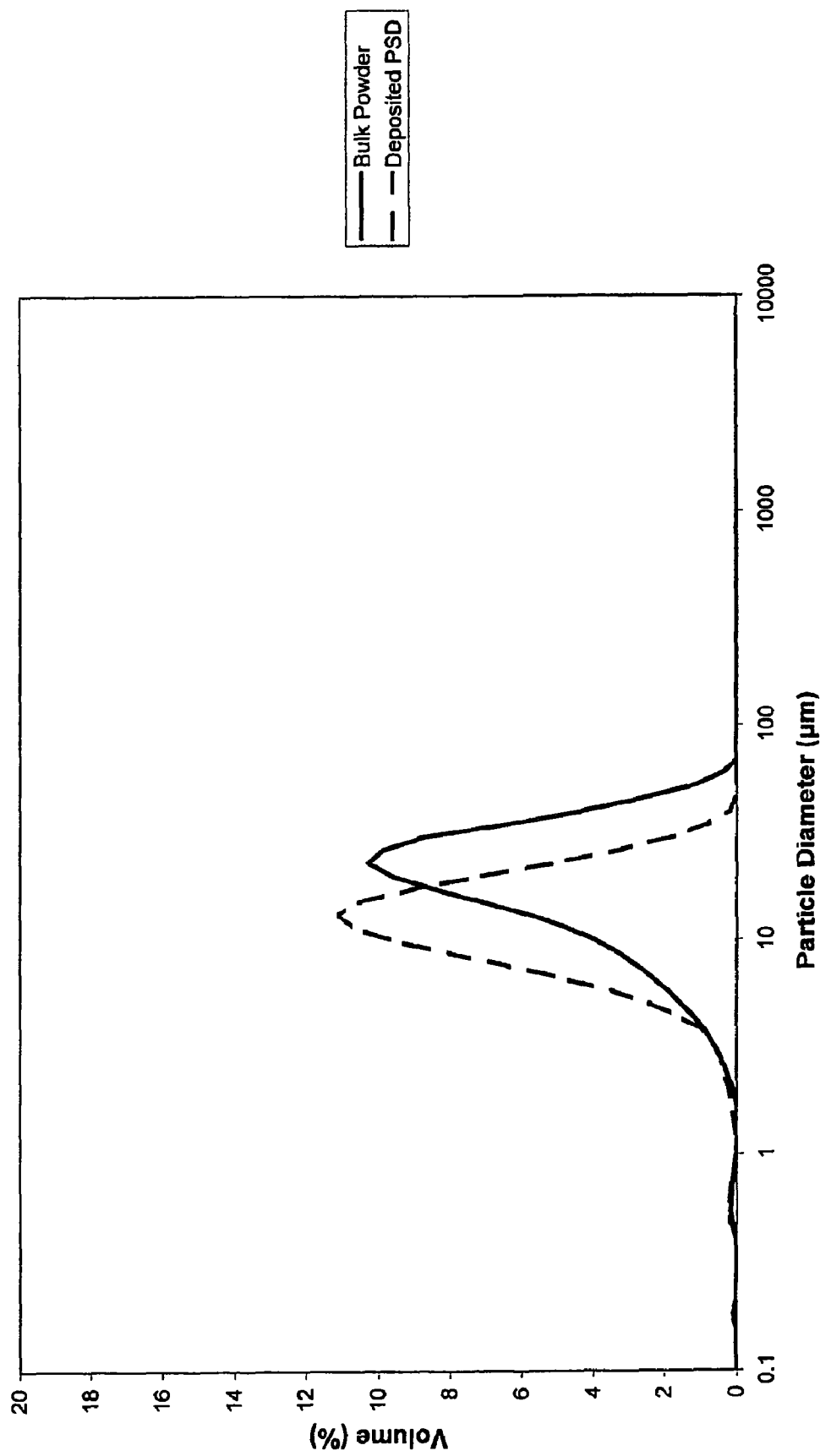
FIG. 3 shows a plot of the particle size distribution for the bulk powder and deposited powder averaged over 10 panels for powder C6.
Figure 4:
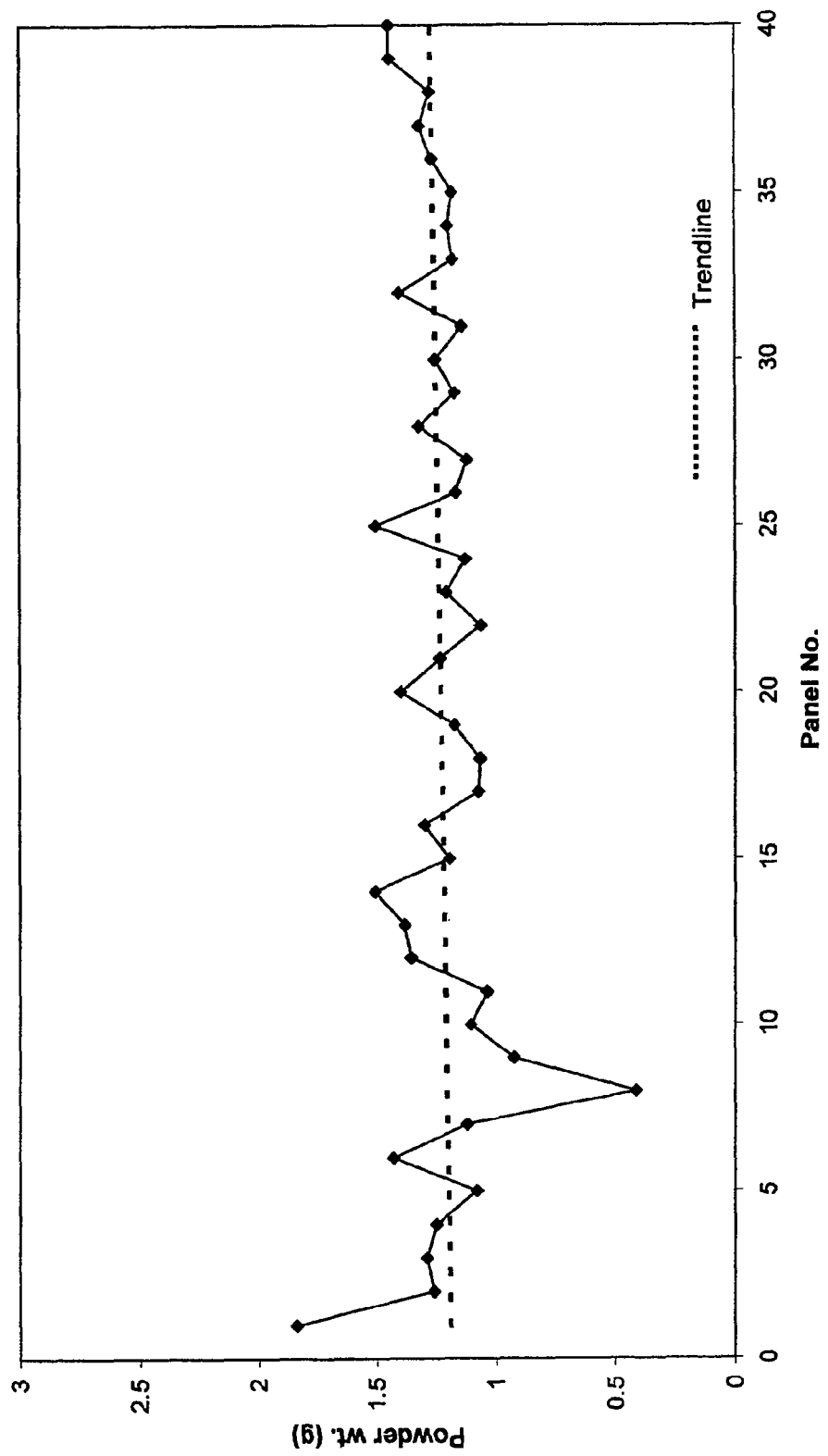
FIG. 4 shows the plot of deposited mass on the panels over time for powder C6.

For Powder C6:
FIG. 2 shows the plot of the d(v,90) and sub-10 μm fraction over time for the deposited powder, and the trendlines for the bulk powder in the fluidised bed are also shown,
FIG. 3 shows a plot of the particle size distribution for the bulk powder and deposited powder averaged over 10 panels, and
FIG. 4 shows the plot of deposited mass on the panels over time.

Figure 5:
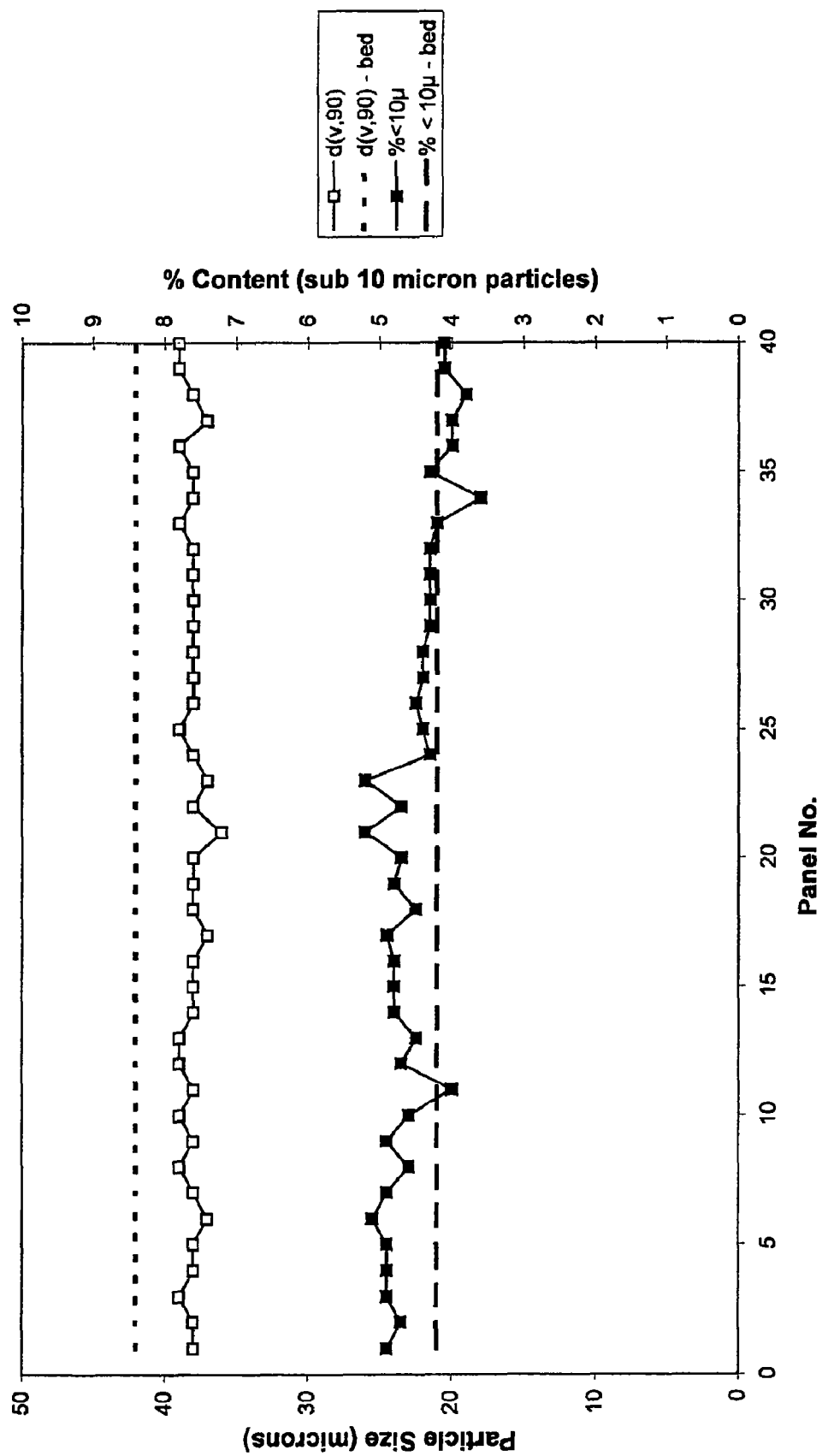
FIG. 5 shows the plot of the $d(v,90)$ and sub-l0µm fraction over time for the deposited powder, and the trendlines for the bulk powder in the fluidised bed are also shown for powder B6.2.
Figure 6:
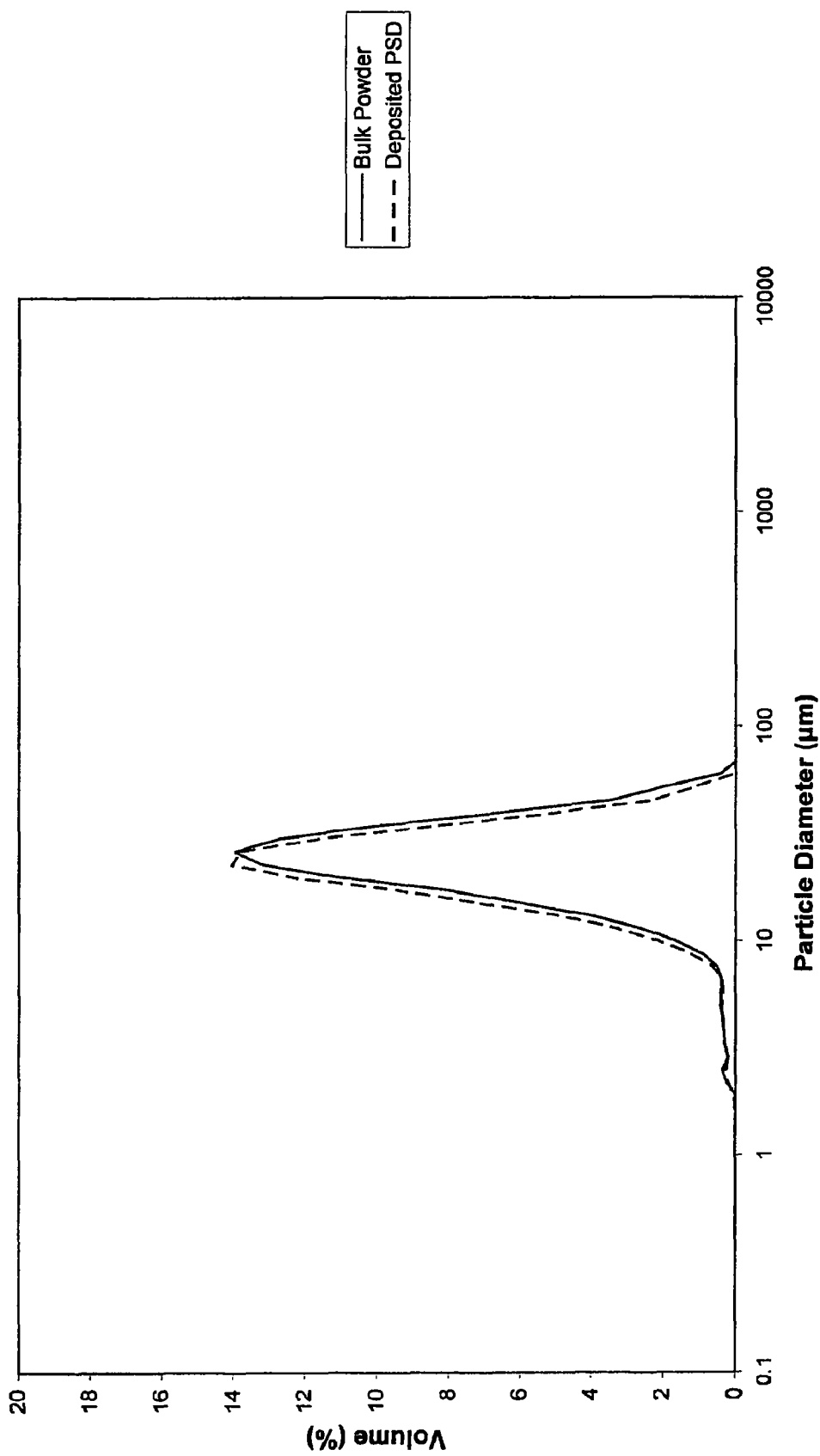
FIG. 6 shows a plot of the particle size distribution for the bulk powder and deposited powder averaged over 10 panels for powder B6.2.
Figure 7:
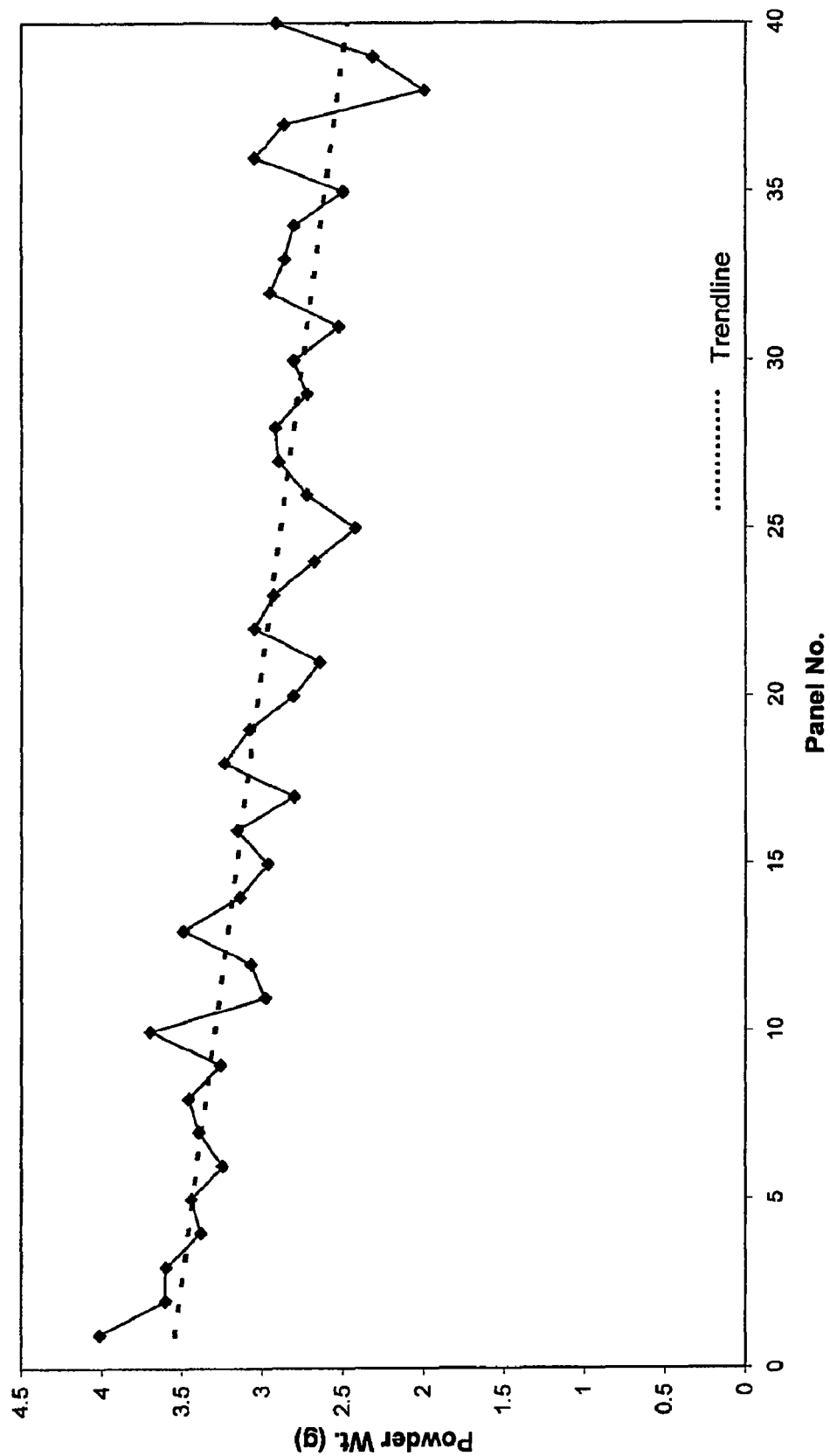
FIG. 7 shows the plot of deposited mass on the panels over time for powder B6.2.

For powder B6.2:
FIG. 5 shows the plot of the d(v,90) and sub-10 μm fraction over time for the deposited powder, and the trendlines for the bulk powder in the fluidised bed are also shown,
FIG. 6 shows a plot of the particle size distribution for the bulk powder and deposited powder averaged over 10 panels, and
FIG. 7 shows the plot of deposited mass on the panels over time.

Figure 8:
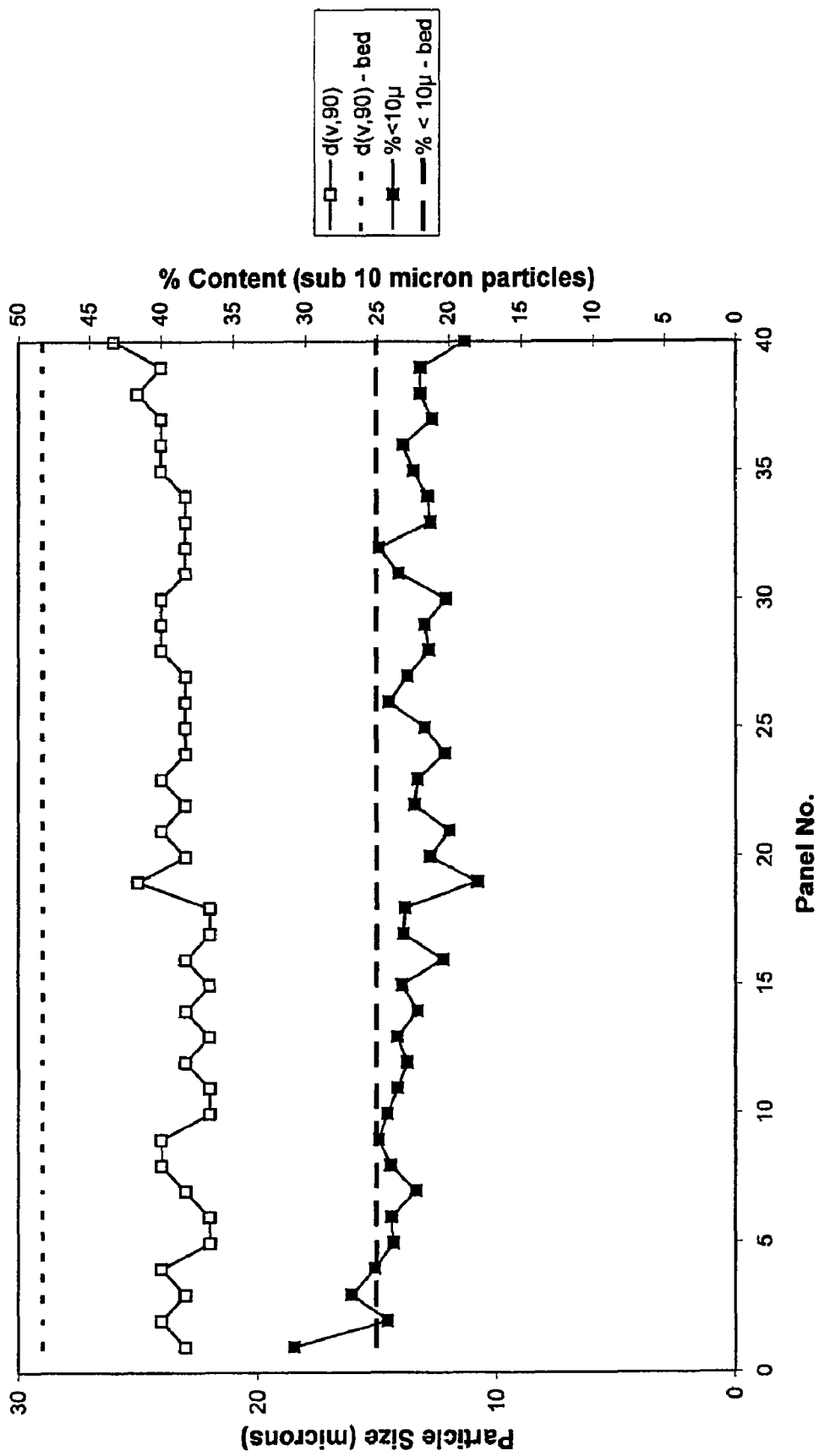
FIG. 8 shows the piot of the $d(v,90)$ and sub-10 µm fraction over time for the deposited powder, and the trendlines for the bulk powder in the fluidised bed are also shown for powder C20.
Figure 9:
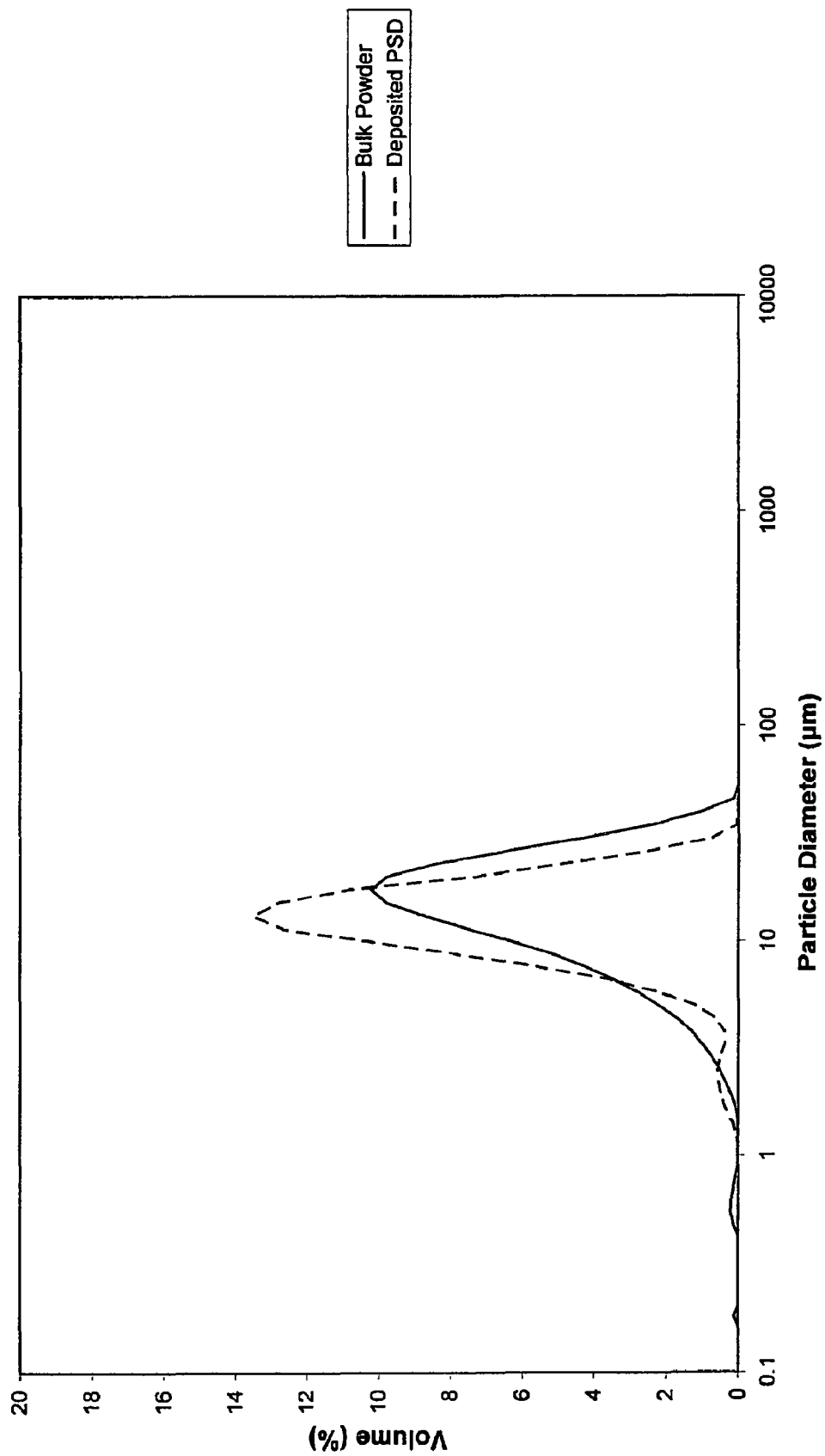
FIG. 9 shows a plot of the particle size distribution for the bulk powder and deposited powder averaged over 10 panels for powder C20.
Figure 10:
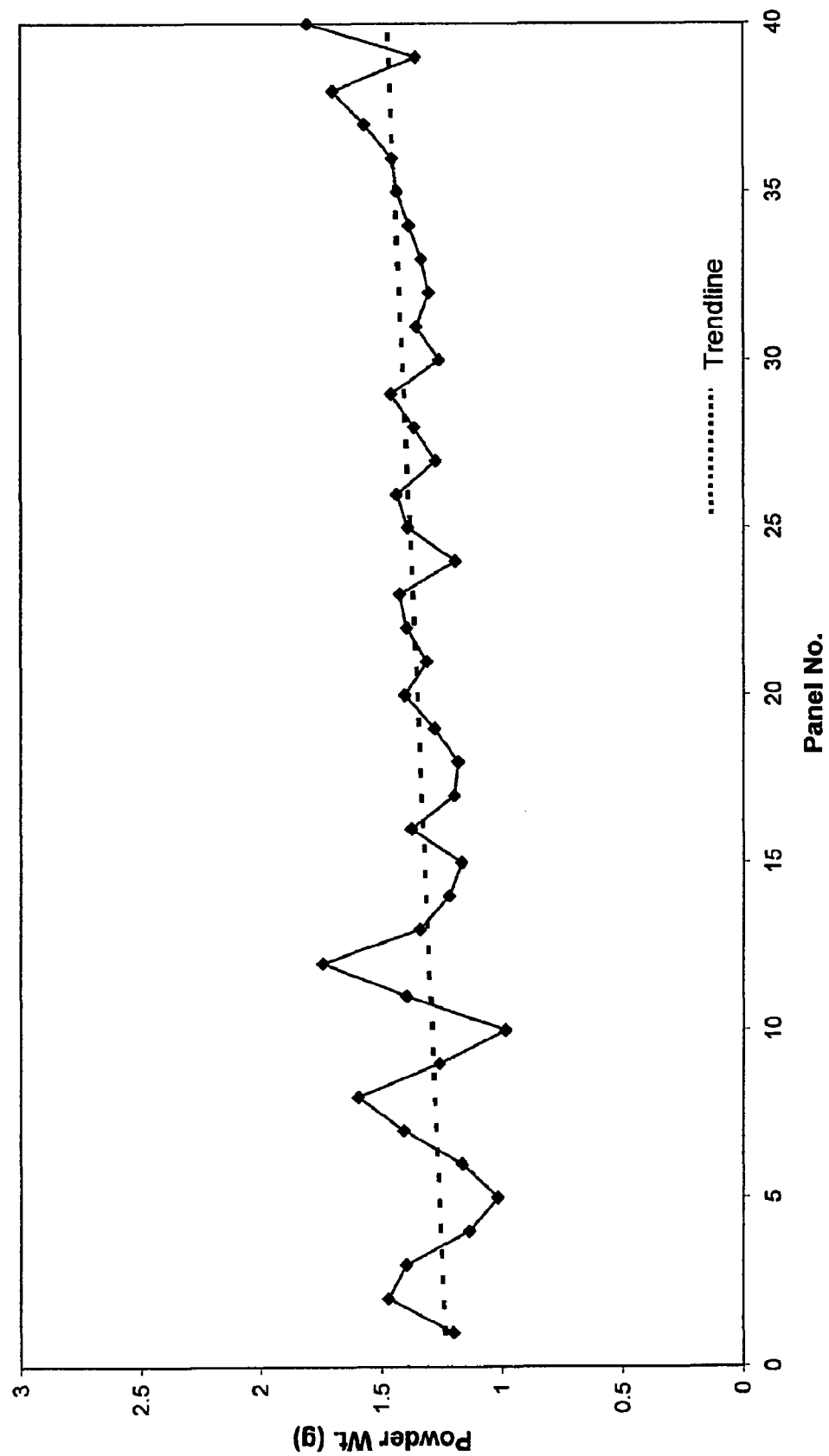
FIG. 10 shows the plot of deposited mass on the panels over time for powder C20.

For Powder C20:
FIG. 8 shows the plot of the d(v,90) and sub-10 μm fraction over time for the deposited powder, and the trendlines for the bulk powder in the fluidised bed are also shown,
FIG. 9 shows a plot of the particle size distribution for the bulk powder and deposited powder averaged over 10 panels, and
FIG. 10 shows the plot of deposited mass on the panels over time.

Figure 11:
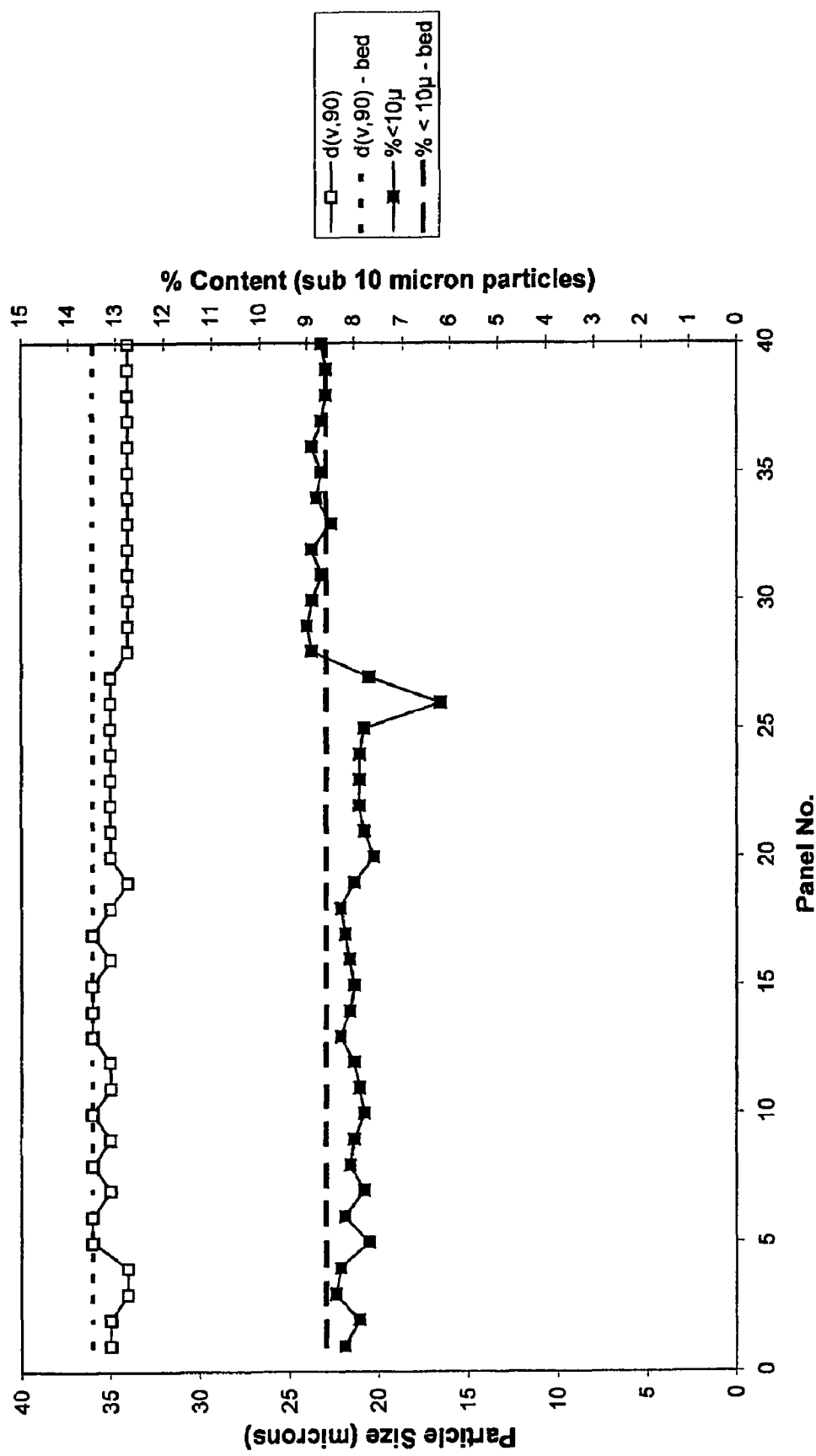
FIG. 11 shows the plot of the d(v,90) and sub-10 μm fraction over time for the deposited powder, and the trendlines for the bulk powder in the fluidised bed are also shown for powder B20.
Figure 12:
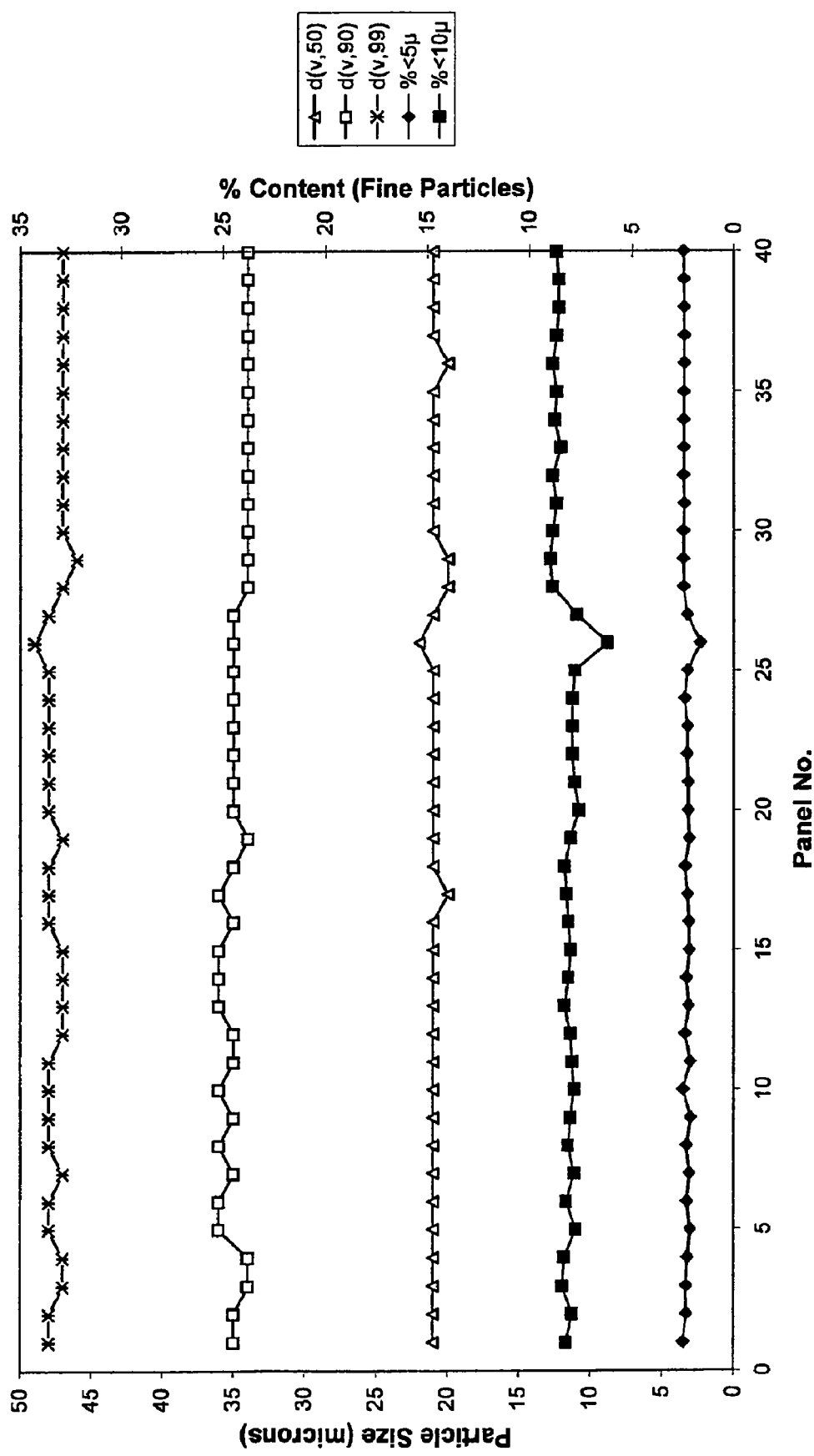
FIG. 12 shows the plot of the d(v,90) d(v,99), d(v,50), sub-10 μm and sub-5 μm fractions over time for the deposited powder.

For Powder B20:
FIG. 11 shows the plot of the d(v,90) and sub-10 μm fractions over time for the deposited powder, and the trendlines for the bulk powder in the fluidised bed are also shown,
FIG. 12 shows the plot of the d(v,90) d(v,99), d(v,50), sub-10 μm and sub-5 μm fractions over time for the deposited powder,
FIG. 13 shows a plot of the particle size distribution for the bulk powder and deposited powder averaged over 10 panels, and
FIG. 14 shows the plot of deposited mass on the panels over time.

Figure 2:
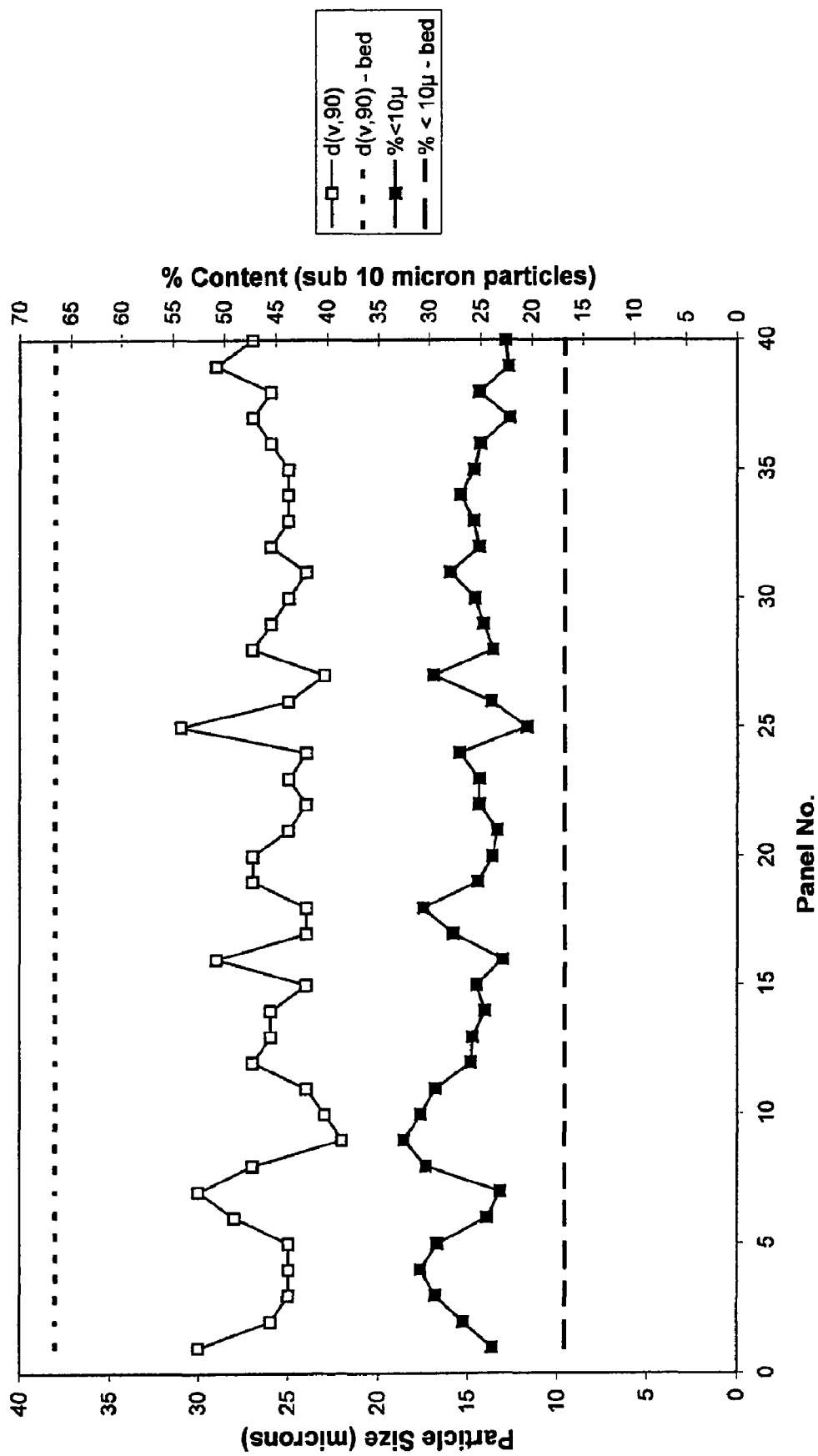
FIG. 2 shows the plot of the $d(v,90)$ and sub-10 µm fraction over time for the deposited powder, and the trendlines for the bulk powder in the fluidised bed are also shown for powder C6.

FIG. 2, relating to powder C6, shows a wide variation in the particle size distribution of powder deposited from panel to panel as the process is continued. As illustrated in Table 21, the powder deposited contains a higher sub-10 μm content and a lower d(v,90) than the bulk powder used in the fluidised bed. As can also be seen from FIG. 2, there is a large difference between the particle size distribution of the powder deposited on the panel and the particle size distribution of the powder in the fluidised bed, and over time there will be a drift in the particle size distribution of the bed itself. FIG. 3 illustrates how the particle size distributions of the deposited powder and the bulk powder do not match, as also shown in Table 22. As shown in FIG. 3, the powder deposited on the substrate had a different particle size distribution from that of the powder in the fluidised bed: a lower median value and lower maximum particle size are found in the deposited powder. FIG. 4 shows the resulting changes in deposited mass on the panels as the process is continued. Clearly the process is not stable. With powders B6.2, (FIGS. 5 to 7) and C20 (FIGS. 8 to 10), improved results are obtained, but again the process is not stable. None of powders C6, B6.2, and C20 comply with the requirements of the preferred sub-class of powders of the invention having d(v,90)≦40 μm, or the especially preferred sub-class of powders having d(v,90)≦36 μm, and % sub-10 μm ≦10%.

Figure 13:
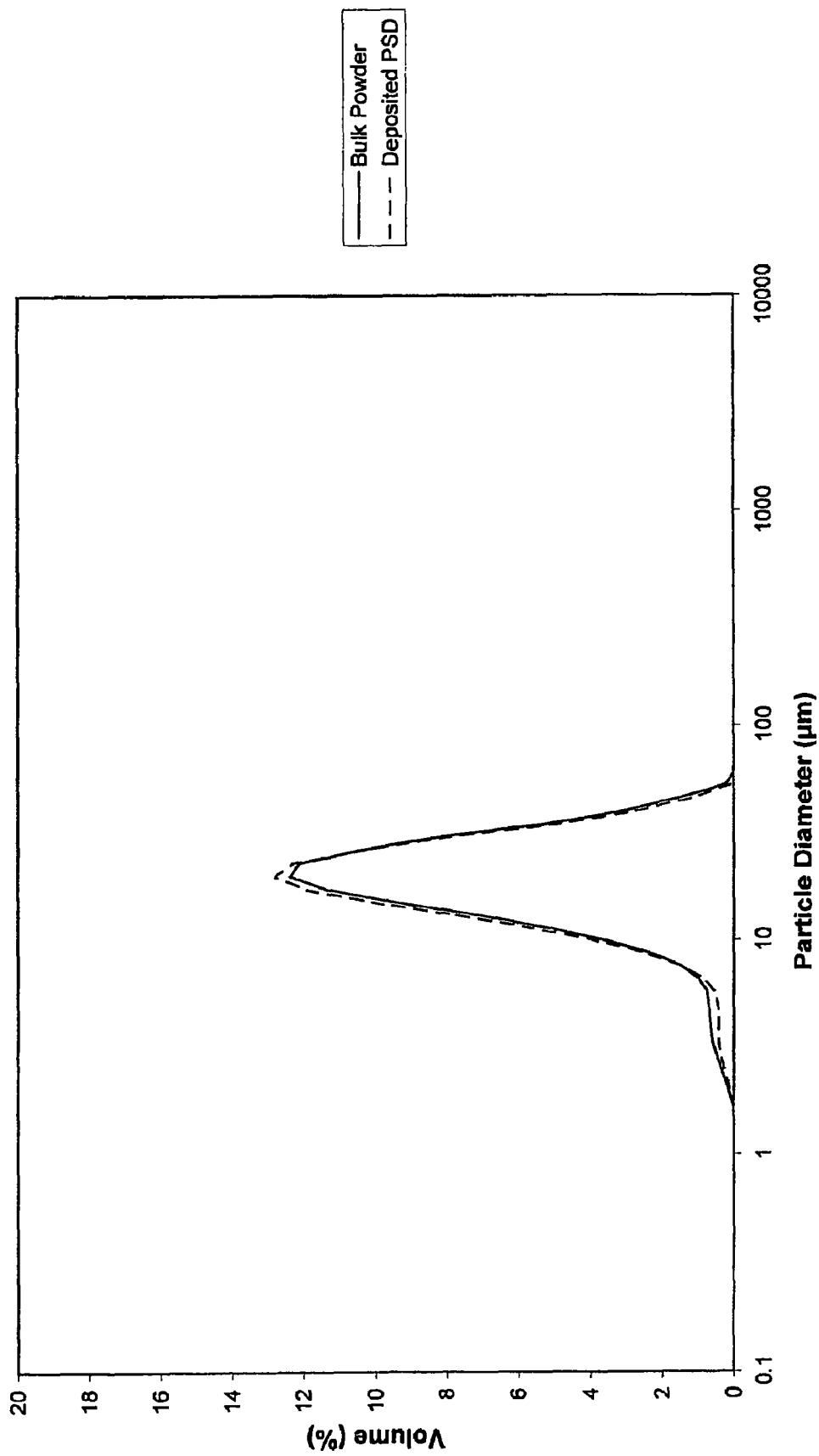
FIG. 13 shows a plot of the particle size distribution for the bulk powder and deposited powder averaged over 10 panels for powder B20.
Figure 14:
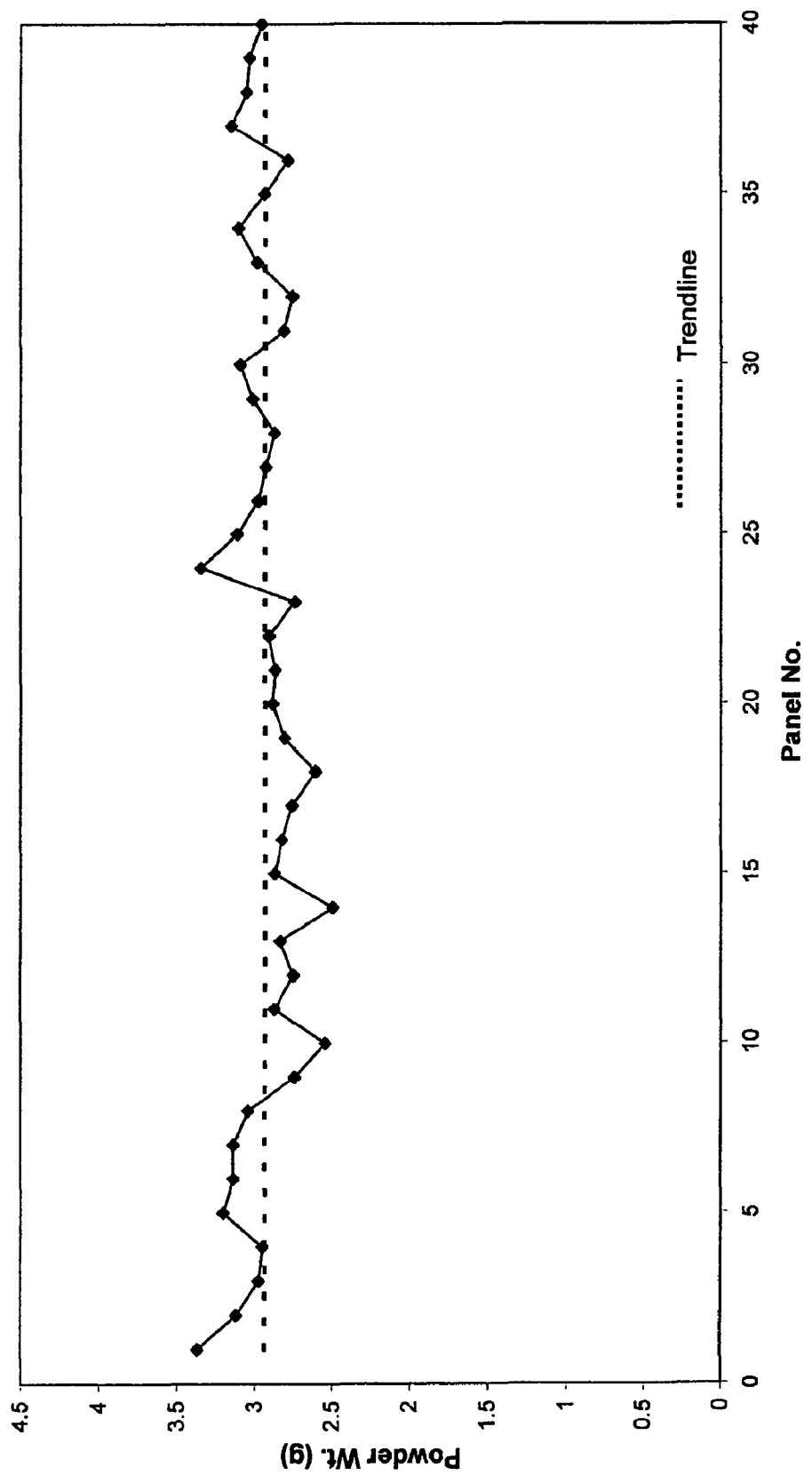
FIG. 14 shows the plot of deposited mass on the panels over time for powder B20.

However, with powder B20, which falls within the especially preferred sub-class of the powders of the invention, there is a closer similarity between the powder size distribution of the powder in the bed and the powder deposited (FIG. 11) and between the powder deposited on the different panels (FIG. 12), and FIG. 13 shows a considerable and remarkable close match between the powder and the powder deposited at all particle sizes, and there is a substantially constant mass of powder deposited as the process proceeds, as illustrated by the horizontal trendline in FIG. 14. This trend continues when larger-scale batches are prepared.

From Table 22 only powder B20 has a difference of 2% or less in the content of sub-10 μm particles and a difference of 6.5% or less in the d(v,90) value of the powder used and powder deposited. As clearly seen in the Figures, this matching particle size distribution results in process stability. Like powder B6.2, powder B20 has % sub-10 μm ≦10% and $[d(s,90)/d(s,10)]^2 \div [d(s,90)-7] \leq 3.5$, but only powder B20 also has d(v,90)<40 μm and in fact <36 μm b) Test on Air-Classified Powder P The air-classified powder P from Example 4 above was also deposited in like manner in a series of substrates (around 1 panel per 3 minutes). The results as determined by the Mastersizer 2000 are shown in Table 23 and the FIGS. 15 to 17 below.

TABLE 23

| Powder P + additive | Sub-10 µm content | d(v, 90) | d(v, 99) |
|---|---|---|---|
| Bulk powder in bed | 10.5% | 37 µm | 51 µm |
| Powder deposited av 40 panels | 12.3% | 33.0 µm | 46 µm |
| Difference relative to deposited powder | −1.8%** | +12% | |

(**difference is difference in absolute figures)

FIG. 15 shows the plot of the d(v,90) and sub-10 µm fraction over time for the deposited powder for powder P, and the trendlines for the bulk powder in the fluidised bed for the same powder are also shown, FIG. 16 shows a plot of the particle size distribution for the bulk powder and deposited powder averaged over 10 panels, and FIG. 17 shows the plot of deposited mass on the panels over time for the same powder.

The deposited powder and bulk powder do not match (FIGS. 15 and 16) and it can be seen that the mass of powder deposited changes over time. (FIG. 17).

Air-classified powder P has a difference of 2% or less in the content of sub-10 µm particles but a difference of 12% in the d(v,90) value of the powder used and powder deposited.

Although it is a powder of the invention it is not a preferred "matching" powder when applied under the process conditions mentioned in this Example.

Example 9

Evenness of Applied Thickness (Even Laydown) Test

Application Method

The fluidised bed process used was as described in WO 99/30838, with particular reference to FIG. 1 of that specification.

In turn, each of powders C6 and B20 containing 0.6% of additive 1 were deposited into an earthed fluid bed, and a fluidizing pressure of 1.2 bar was applied. An aluminium panel (7×7 cm) was then submerged into the fluidized powder, and a voltage applied. A series of panels were coated in this manner while varying the amount of time the panels were submerged in the powder ('dip time'). Once coated, a visual assessment was made of the amount of coverage, and the amount was quoted as a percentage. The panels were then baked in an oven for 15 minutes at 200° C. and the film thickness measured at a number of points across each panel.

The results are given in the Table 24 below.

TABLE 24

| Powder | Voltage (kV) | Dip Time (sec) | Coverage (%) |
|---|---|---|---|
| C6 | +2 | 15 | 40 |
| C6 | +2 | 30 | 75 |
| C6 | +2 | 45 | 90 |
| C6 | +2 | 60 | 95 |
| C6 | +2 | 75 | 100 |
| C6 | +2 | 90 | 100 |

TABLE 24-continued

| Powder | Voltage (kV) | Dip Time (sec) | Coverage (%) |
|---|---|---|---|
| B20 | +2 | 15 | 80 |
| B20 | +2 | 30 | 95 |
| B20 | +2 | 45 | 100 |
| B20 | +2 | 60 | 100 |
| B20 | +2 | 75 | 100 |
| B20 | +2 | 90 | 100 |

From this result, it can be seen that the powder of the invention (Powder B20) achieved total coverage in a shorter space of time. Therefore, for a given film thickness, the powder of the invention would achieve this with a shorter dip time (see also Example 10). The film thickness measurements for these panels are shown in the following Table 25.

TABLE 25

| Powder | Dip Time (sec) | Average Film Thickness (µm) | Standard Deviation (µm) | Standard Deviation (%) |
|---|---|---|---|---|
| C6 | 15 | 31.3 | 35.8 | 114 |
| C6 | 30 | 49.1 | 40.7 | 83 |
| C6 | 45 | 57.7 | 42.3 | 73 |
| C6 | 60 | 67.4 | 54.8 | 81 |
| C6 | 75 | 45.3 | 24.3 | 54 |
| C6 | 90 | 63.4 | 36.7 | 58 |
| B20 | 15 | 36.2 | 19.2 | 53 |
| B20 | 30 | 44.8 | 21.5 | 48 |
| B20 | 45 | 62.7 | 16.3 | 26 |
| B20 | 60 | 72.9 | 18.0 | 25 |
| B20 | 75 | 82.0 | 14.4 | 18 |
| B20 | 90 | 83.0 | 9.8 | 12 |

It can be seen that the variation in film thickness was much less for the powder of the invention. This yielded more even coatings with excellent appearance. Using bonded powders especially with lower sub-10 µm fractions produces even coatings with little film thickness variation. However, from these results, it is also clear that total coverage is achieved faster using such powders. Example 10 further investigates what effect the bonding of powders has on coating time.

Example 10

Coating Speed Test

Application Method

The fluidised bed process used was as described in WO 99/30838, with particular reference to FIG. 1 of that specification.

In turn, each of the powders C6, B6.2, C20 and B20 containing 0.6% of additive 1 was deposited into a fluid bed, and a fluidizing pressure of 1.2 bar applied. A series of panels were then coated using the dip/applied voltage method described in Example 7a. A range of voltages and 'dip times' were used. In each case, the weight of deposited powder was recorded, and the rate of deposition (g/s) was calculated. The tests were done in duplicate.

The results, reported in the Table 26 below, showed that, for a given time, the weight of deposited powder was greater when powders of the invention were used. This, in turn, led to faster rates of deposition being obtained for these powders.

Applied Voltage=+2.5 kV Dip Time=15 sec. Substrate=7×7 cm Aluminium

TABLE 26

| Powder | Wt 1 (g) | Rate 1 (g/s) | Wt 2 (g) | Rate 2 (g/s) |
|---|---|---|---|---|
| C6 | 0.967 | 0.064 | 0.945 | 0.063 |
| B6.2 | 1.374 | 0.092 | 1.283 | 0.086 |
| C20 | 1.019 | 0.068 | 0.906 | 0.060 |
| B20 | 1.952 | 0.130 | 2.002 | 0.133 |

The results are shown graphically in FIG. 18.

The invention claimed is:

1. A process for forming a coating on a substrate, the process comprising applying a powder coating to a substrate using a tribo-charging electrostatic fluidised bed process wherein the powder coating has a particle size distribution such that
   a) d(v,90)<42.5 μm, and
   b) i) the percentage of particles <10 μm in size is <12% by volume, and/or
   ii)
   $$\frac{[d(s, 90)/d(s, 10)]^2}{[d(s, 90) - 7]} \leq 3.5,$$
   d(s,90) being greater than 7 μm and d(s,90) and d(s,10) being measured in microns.

2. A process as claimed in claim 1, in which the powder coating material is such that when applied to the substrate by the tribo-charging electrostatic fluidised bed process over a series of 40 panels the powder material deposited has a powder size distribution such that there is:
   a difference of 2% by volume or less as an absolute figure in the content of sub-10 μm particles; and
   a difference of no more than 6.5% in the d(v,90);
between the powder material in the fluidised bed and the powder material deposited by the fluidised bed, relative to the powder material deposited.

3. A process as claimed in claim 1, in which a voltage is applied to at least one of the substrate; a conducting part of a fluidising chamber of a fluidised bed; and an electrically conductive electrode positioned in the fluidised bed in such a position relative to the substrate that the extent to which charged particles adhere to regions of the substrate is influenced by the electrode.

4. A process as claimed in claim 3, in which the voltage is applied to the substrate for at least part of a period of immersion, and the substrate is made of a conducting material.

5. A process as claimed in claim 4, in which the fluidised bed includes the fluidising chamber at least a part of which is conductive, and the voltage is applied to the conductive part of the fluidising chamber, the substrate being either electrically isolated or earthed.

6. A process as claimed in claim 4, in which the potential gradient in the system is below 30 kV/cm.

7. A process as claimed in claim 3, in which one or more counter-electrodes are disposed within the bulk of a fluidised powder.

8. A process as claimed in claim 3, in which the voltage is applied to the electrically conductive electrode positioned in the fluidised bed in such a position relative to the substrate that the extent to which charged particles adhere to regions of the substrate is influenced by the electrode, the substrate being either electrically isolated or earthed and being non-conductive.

9. A process as claimed in claim 8, in which there is provided a second electrode to which is applied a voltage that is of polarity opposite to the voltage applied to the electrically conductive electrode, said electrically conductive electrode and said second electrode being on opposite sides of the substrate and the second electrode being positioned to influence the extent to which charged particles adhere to a region of the substrate, there also being provided means for applying a voltage of the opposite polarity to the second electrode.

10. A process as claimed in claim 8, in which there is provided at least one further electrode adjacent to the electrically conductive electrode, the at least one further electrode being positioned to influence the extent to which charged particles adhere to a respective region of the substrate or respective regions of the substrate, there also being provided means for applying a voltage of the same polarity to the at least one further electrode.

11. A process as claimed in claim 2, in which a voltage is applied to a member of the group consisting of the substrate; a conducting part of a fluidising chamber of a fluidised bed; and an electrically conductive electrode positioned in the fluidised bed in such a position relative to the substrate that the extent to which charged particles adhere to regions of the substrate is influenced by the electrode.

12. A process as claimed in claim 6, in which one or more counter-electrodes are disposed within the bulk of a fluidised powder.

13. A process as claimed in claim 5, in which the voltage is applied to the electrically conductive electrode positioned in the fluidised bed in such a position relative to the substrate that the extent to which charged particles adhere to regions of the substrate is influenced by the electrode, the substrate being either electrically isolated or earthed and being non-conductive.

14. A process as claimed in claim 6, in which the voltage is applied to the electrically conductive electrode positioned in the fluidised bed in such a position relative to the substrate that the extent to which charged particles adhere to regions of the substrate is influenced by the electrode, the substrate being either electrically isolated or earthed and being non-conductive.

15. A process as claimed in claim 3, in which the voltage is applied to the electrically conductive electrode positioned in the fluidised bed in such a position relative to the substrate that the extent to which charged particles adhere to regions of the substrate is influenced by the electrode, the substrate being either electrically isolated or earthed and having a surface resistance of between $10^3$ ohms/square and $10^{11}$ ohms/square.

16. A process as claimed in claim 3, in which the voltage is applied to the electrically conductive electrode positioned in the fluidised bed in such a position relative to the substrate that the extent to which charged particles adhere to regions of the substrate is influenced by the electrode, the substrate being either electrically isolated or earthed and being selected from medium density fibre-board, wood, wood products and plastics materials, said plastics materials optionally including electrically conducting additives.

* * * * *